United States Patent
Erb et al.

(10) Patent No.: US 11,220,342 B2
(45) Date of Patent: Jan. 11, 2022

(54) AIRCRAFT SEAT DEVICE

(71) Applicant: RECARO Aircraft Seating GmbH & Co. KG, Schwaebisch Hall (DE)

(72) Inventors: Andreas Erb, Schwaebisch Hall (DE); Zoltan Jussli, Bretzfeld (DE); Michael Horlacher, Schwaebisch Hall (DE); Javier Parrilla Calle, Stuttgart (DE); Jürgen Baumann, Bodmann-Ludwigshafen (DE); Andreas Itzinger, Michelfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 16/500,226

(22) PCT Filed: Apr. 3, 2018

(86) PCT No.: PCT/EP2018/058501
§ 371 (c)(1),
(2) Date: Oct. 2, 2019

(87) PCT Pub. No.: WO2018/185108
PCT Pub. Date: Oct. 11, 2018

(65) Prior Publication Data
US 2020/0108936 A1     Apr. 9, 2020

(30) Foreign Application Priority Data

Apr. 3, 2017 (DE) .................... 10 2017 107 140.7
Jun. 13, 2017 (DE) .................... 10 2017 113 037.3

(51) Int. Cl.
*B64D 11/06* (2006.01)
*B60N 2/02* (2006.01)

(52) U.S. Cl.
CPC ................ *B64D 11/0639* (2014.12)

(58) Field of Classification Search
CPC ... B64D 11/064; B64D 11/0643; B64D 11/06; B64D 11/0639
See application file for complete search history.

(56) References Cited

U.S. PATENT DOCUMENTS

| 6,237,994 B1 | 5/2001 | Bentley et al. |
| 7,195,316 B2 * | 3/2007 | Shimasaki ............. A47C 7/024 297/284.11 |

(Continued)

FOREIGN PATENT DOCUMENTS

| DE | 19705477 A1 | 8/1998 |
| DE | 603 00 365 T2 | 4/2006 |

(Continued)

OTHER PUBLICATIONS

Search Report dated Feb. 23, 2018 issued in corresponding DE patent application No. 10 2017 113 037.3 (and partial English translation).

(Continued)

*Primary Examiner* — Shin H Kim
(74) *Attorney, Agent, or Firm* — Posz Law Group, PLC

(57) ABSTRACT

An aircraft seat device for an aircraft seat includes at least one mounting unit, having at least one seat bottom which is coupled with the mounting unit and is configured to implement a seating region and to this end has at least one main unit and at least one sub-unit that in relation to the mounting unit is implemented so as to be adjustable between a stowage position and a use position. The at least one adjustable sub-unit is configured for enlarging the seating region in at least one position, and having at least one actuation mechanism by means of which the adjustable sub-unit of the seat bottom is adjustable between its stowage position and its use position.

20 Claims, 8 Drawing Sheets

(56) References Cited

U.S. PATENT DOCUMENTS

| | | | |
|---|---|---|---|
| 9,650,145 B2* | 5/2017 | Lambert | B60N 2/0284 |
| 2003/0226934 A1 | 12/2003 | Saint-Jalmes | |
| 2005/0062324 A1 | 3/2005 | Shimasaki et al. | |
| 2007/0200524 A1 | 8/2007 | Robert et al. | |
| 2008/0121757 A1* | 5/2008 | Pozzi | B64D 11/06 244/118.6 |
| 2010/0060060 A1 | 3/2010 | Hansen | |
| 2010/0244534 A1* | 9/2010 | Driessen | B64D 11/0649 297/423.35 |
| 2010/0253129 A1* | 10/2010 | Dowty | B64D 11/06395 297/85 M |
| 2011/0215200 A1* | 9/2011 | Mejuhas | B64D 11/0643 244/118.6 |
| 2012/0025571 A1 | 2/2012 | Merensky | |
| 2012/0267928 A1 | 10/2012 | Mankame et al. | |
| 2013/0113250 A1* | 5/2013 | Udriste | B64D 11/06395 297/217.3 |
| 2013/0234486 A1 | 9/2013 | Duus et al. | |
| 2014/0265513 A1* | 9/2014 | Lambert | B60N 2/34 297/440.1 |
| 2015/0036060 A1* | 2/2015 | Yaghoubi | H04N 5/655 348/837 |
| 2016/0288668 A1 | 10/2016 | Cortney et al. | |
| 2017/0015423 A1* | 1/2017 | Udriste | B60N 2/34 |
| 2017/0073081 A1 | 3/2017 | Regan et al. | |
| 2018/0086468 A1* | 3/2018 | Beroth | B60N 2/2222 |
| 2018/0162534 A1* | 6/2018 | Jakubowski | B64D 11/0647 |

FOREIGN PATENT DOCUMENTS

| | | |
|---|---|---|
| DE | 10 2007 002 371 B3 | 5/2008 |
| DE | 10 2007 047 651 B3 | 2/2009 |
| DE | 102009043296 A1 | 4/2011 |
| DE | 10 2010 046 853 A1 | 3/2012 |
| DE | 202009018280 U1 | 1/2014 |
| GB | 2449451 A | 11/2008 |
| GB | 2497588 A | 6/2013 |

OTHER PUBLICATIONS

International Search Report dated Jul. 3, 2018 issued in corresponding International patent application No. PCT/EP2018/058501.
International Preliminary Report on Patentability dated Oct. 8, 2019 issued in corresponding International patent application No. PCT/EP2018/058501.

* cited by examiner

AIRCRAFT SEAT DEVICE

CROSS REFERENCE TO RELATED APPLICATIONS

This application is a U.S. national stage application of PCT/EP2018/058501 filed on Apr. 3, 2018, which is based on German Patent Application No. 10 2017 107 140.7 filed on Apr. 3, 2017, and German Patent Application No. 10 2017 113 037.3 filed on Jun. 13, 2017, the contents of which are incorporated herein by reference.

PRIOR ART

The invention relates to an aircraft seat device for an aircraft seat.

Various aircraft seat devices for aircraft seats, having at least one mounting unit and having at least one seat bottom which is coupled to the mounting unit and is configured to implement a seating region have already been proposed.

The object of the invention lies in particular in providing a generic device having improved properties in terms of passenger comfort. The object is achieved according to the invention by the features of patent claim 1 while advantageous design embodiments and refinements of the invention can be derived from the dependent claims.

Advantages of the Invention

According to the invention, an aircraft seat device for an aircraft seat, having at least one mounting unit, having at least one seat bottom, which is coupled with the mounting unit and is configured to implement a seating region and to this end has at least one main unit and at least one sub-unit that in relation to the mounting unit is implemented so as to be adjustable between a stowage position and a use position, wherein the at least one adjustable sub-unit is configured for enlarging the seating region in at least one position, and having at least one actuation mechanism, by means of which the adjustable sub-unit of the seat bottom is adjustable between its stowage position and its use position, is proposed.

An "aircraft seat device" herein is in particular to be understood to be a device which configures at least part of an aircraft seat or an entire aircraft seat. An "aircraft seat" herein is in particular to be understood as a seat which is configured to be set up on a stand on a cabin floor in an aircraft cabin of an aircraft and on which a passenger can sit during a flight. The aircraft seat herein has at least one seat bottom and a backrest which is coupled to the seat bottom, wherein the backrest is preferably pivotably connected to the seat bottom, on account of which the aircraft seat is preferably movable to various functional positions. A "mounting unit" herein is in particular to be understood to be a unit by way of which the aircraft seat is fixedly coupled to a cabin floor and to this end has in particular at least one seat foot, which by way of a fastening rail is fixedly coupled to the cabin floor, and at least one transverse element which is connected to the seat foot and to which at least one seat divider and/or a seat bottom of the aircraft seat are/is linked. A "backrest" herein is in particular to be understood to be an element of the aircraft seat which configures at least a part of a backrest bearing face on which a passenger sitting on the aircraft seat can rest his/her back. The backrest herein preferably comprises at least one base body and an upholstery unit which configures the backrest bearing face. The backrest preferably has a supporting frame by way of which the backrest is connected to the mounting unit and/or the seat bottom. A frame of the backrest herein can be formed as an encircling frame, for example from a light metal, or from a self-supporting fiber composite material so as to be integral to the remainder of the backrest. The backrest herein is disposed on a rear end of the seat bottom and from the seat bottom unit extends upward, away from a mounting unit. A "seat bottom" herein is in particular to be understood to be a component of an aircraft seat which configures a seating region for a passenger. A "seating region" herein is in particular to be understood as a region of the aircraft seat which is configured for a passenger to be seated thereon in particular during a flight. A "main unit" herein is in particular to be understood to be a unit of the seat bottom which is implemented separately from the adjustable sub-unit and which per se configures a seat face on which a passenger can be seated on the aircraft seat. The main unit of the seat bottom herein preferably has a base body and an upholstery unit that is attached to the base body. The base body herein is configured as a seat shell. However, in principle it is also conceivable that the base body is embodied by a covering, in particular by a covered frame, and to this end has in particular a frame and a woven fabric which is stretched over the frame and on which an upholstery unit is disposed. The main unit of the seat bottom herein is preferably coupled to the backrest and adjustable between a sitting position and a comfort position. The main unit of the seat bottom in an adjustment between the sitting position and the comfort position herein is preferably pivoted about a front transverse element of the mounting unit. The main unit of the seat bottom in a sitting position of the aircraft seat preferably per se configures a seat face which is sufficient for an average passenger to be seated thereon in a normal manner. The main unit of the seat bottom in an assembled state extends from the backrest up to a region of the front transverse element of the mounting unit. The main unit without the adjustable sub-unit preferably configures a sufficiently large seating region. An "adjustable sub-unit" herein is in particular to be understood to be a unit of the seat bottom which is implemented separately from the main unit and configures an additional seat face which per se preferably does not configure a stand-alone seat face on which a passenger could be seated. The adjustable sub-unit herein in the transverse direction has a width which is substantially of equal size to a width of the main unit of the seat bottom. The adjustable sub-unit has a depth which is in the range between 10 cm and 25 cm. The depth is preferably approximately 15 cm. The depth of the adjustable sub-unit herein is the dimension, by way of which the adjustable sub-unit in a use position lengthens the seat bottom in a seating direction. The adjustable sub-unit is configured for enlarging the seating region of the seat bottom in at least one position, in particular in at least one use position. In the at least one use position the adjustable sub-unit, conjointly with the main unit, is configured to implement the seating region of the seat bottom. The adjustable sub-unit herein is in particular configured for being disposed on a front end of the main unit, when viewed in the seating direction, and herein for extending the seating region of the main unit toward the front. The adjustable sub-unit herein is preferably connected indirectly to the main unit. The adjustable sub-unit is in particular not connected directly to the main unit of the seat bottom. The adjustable sub-unit is preferably coupled to the main unit of the seat bottom unit by way of the mounting unit, said main unit likewise being linked to the mounting unit. A "stowage position" is in particular to be understood to be a position in which a unit, in particular the adjustable sub-unit, is disposed in an ideally space-saving manner, in particular in an ideally space-saving manner on the aircraft seat. The adjustable sub-unit in the stowage position herein is not able to be used in the intended manner thereof by a passenger. The adjustable sub-unit in the stowage position thereof does not extend the seating region of the seat bottom. The adjustable sub-unit in the stowage position is preferably folded in front of the main unit of the seat bottom and extends downward in the direction of a cabin floor. The adjustable sub-unit herein is folded downward in a manner and has a corresponding depth such that a life jacket pouch can be disposed in a region of the mounting unit of the aircraft seat and be readily reached by a passenger. In the stowage position, the additional seat face which is implemented by the adjustable sub-unit is pivoted by substantially 90 degrees in relation to the seat face of the main unit. A "use position" herein is in particular to be understood to be a position in which a unit, in particular the adjustable sub-unit, is disposed in a position and/or an orientation such that said unit can be used in the intended manner thereof by a passenger seated on the aircraft seat. A use position of the adjustable sub-unit is defined as a position of the adjustable sub-unit in which the adjustable sub-unit is pivoted from the stowage position thereof by at least 5 degrees. The adjustable sub-unit in a use position enlarges the seating region of the seat bottom in that the adjustable sub-unit extends the seating region implemented by the main unit. In a maximum use position, the adjustable sub-unit is pivoted by a maximum adjustment angle in that the additional seat face is oriented so as to be substantially parallel to the seat face of the main unit. "Configured" is in particular to be understood as being specially conceived and/or equipped. An object being configured for a specific function is in particular to be understood to mean that the object fulfils and/or carries out said specific function in at least one application state and/or operating state. A seat bottom of which the seat face when required can advantageously be readily extended so as to achieve an advantageously comfortable and large seat face can advantageously be configured on account thereof. The seat bottom in a state in which no passenger is seated on the seat bottom can advantageously be implemented so as to be advantageously small in the seating direction, and in a state in which a passenger is seated on the seat bottom be extended to a comfortable size. An "actuation mechanism" herein is in particular to be understood to be a mechanism by way of which the adjustable sub-unit can be adjusted by a user, such as in particular by a passenger, between a stowage position and a use position, wherein the actuation mechanism herein is configured for a purely manual actuation by the user, or for adjusting by means of an actuator which is actuated by a user, for example by way of an actuation element.

For example, advantageously narrow seat bottoms can be provided in particular for passenger seat rows which are disposed behind an emergency exit of an aircraft seat when no passenger is seated on said seat bottoms, on account of which the escape paths to the emergency exits can be implemented so as to be advantageously wide without restricting the comfort of the passenger seats.

It is furthermore proposed that the adjustable sub-unit is configured to be continuously blockable between its stowage position and its use position by means of the at least one actuation mechanism. "Capable of being blocked in a stepless manner" herein is in particular to be understood to mean that the adjustable sub-unit can in the position thereof in relation to the mounting unit be fixed in any arbitrary position between the stowage position and the maximum use position, wherein forces which act on the adjustable sub-unit are dissipated into the mounting unit by way of a mounting and the actuation mechanism. On account thereof, the adjustable sub-unit can be set in a particular individual manner by a passenger, and on account thereof the aircraft seat can be implemented so as to be particularly advantageously comfortable for different passengers.

It is furthermore proposed that the at least one actuation mechanism has at least one actuation element, via which the adjustable sub-unit is adjustable by a passenger. An "actuation element" is in particular to be understood to be an element which in an operating procedure is configured for receiving an input variable from a user and in particular to be contacted directly by a user, wherein touching the actuation element is sensed and/or an actuation force exerted on the actuation element is sensed and/or for actuating a unit is mechanically transmitted. The actuation element herein is preferably embodied as a pushbutton which is capable of being operated by applying pressure from one side. In principle, it is also conceivable for the actuation element to be embodied as a pushbutton which is capable of being operated by being impinged with pressure from two sides, thus by squeezing. In principle, it is just as conceivable for the actuation element to be embodied as a rotary element which is capable of being operated by an impingement with a torque and is rotated out of position in an operating procedure. "Adjustable by a passenger" herein is in particular to be understood to mean that an adjustment takes place as a direct consequence of the actuation of the actuation element by a user, said user being in particular a passenger seated on the aircraft seat. An adjustment of the adjustable sub-unit herein preferably takes place either without any further influence of force on the adjustable sub-unit by the passenger in that an actuator element that is actuated on account of the actuation of the actuation element exerts an actuation force on the adjustable sub-unit, on account of an actuation force exerted on the adjustable sub-unit by a passenger, or on account of a combination of an actuation force provided on account of the actuator element and an actuation force exerted by a passenger. On account thereof, the adjustable sub-unit can be adjusted in a particularly simple manner by a user.

It is furthermore proposed that the actuation mechanism comprises at least one sensor device which, for adjusting the adjustable sub-unit, detects at least one parameter. A "sensor device" in this context is in particular to be understood to be a device which is configured for receiving at least one parameter and/or one physical property, wherein the receiving can take place in an active manner such as, in particular, by generating and emitting an electrical measuring signal, and/or in a passive manner such as, in particular, by detecting variations in the property of a sensor component. Various sensor units that appear expedient to the person skilled in the art are conceivable. Parameters which are detectable by means of the sensor device herein are inter alia in particular a pressure, weight, and/or a length. On account thereof, an adjustment of the adjustable sub-unit can advantageously be initiated by predefined parameters.

It is furthermore proposed that the actuation mechanism comprises at least one actuator element which, for adjusting the adjustable sub-unit, is actuatable by the actuation element and/or by the sensor device. An "actuator element" herein is in particular to be understood to be an element which at least in an actuated state is configured for providing an actuation force. On account thereof, the adjustable sub-unit can be adjusted in a particularly advantageous manner.

It is furthermore proposed that the actuator element is embodied as a spring element. A "spring element" herein is in particular to be understood to be an element which has at least one extent which in a normal operating state is elastically variable by at least 10%, in particular by at least 20%, preferably by at least 30%, and particularly advantageously by at least 50%, and which generates in particular a counter force which depends on a variation of the extent and is preferably proportional to said variation and counteracts the variation. An "extent" of an element is in particular to be understood to be a maximum spacing of two points of a perpendicular projection of the element onto a plane. The spring element herein is preferably implemented as an adjustable gas pressure spring. An adjustable gas pressure spring herein is actuatable by a passenger and emits an actuation force only in an actuated state and is locked in and non-actuated state. In principle, it would also be conceivable for the spring element to be implemented as another spring that appears expedient to the person skilled in the art, for example as a coil spring. On account thereof, the actuator element can be implemented in a particularly simple manner.

It is moreover proposed that the actuator element is embodied as an electric servomotor. On account thereof, the actuator element can be implemented in a particularly advantageous manner for precisely adjusting the sub-unit It is furthermore proposed that, for triggering the adjustment of the adjustable sub-unit, the sensor device is configured at least for a detection of a seating force acting on the seat bottom. On account of the seating force acting on the seat bottom, an adjustment of the adjustable sub-unit from the stowage position to a use position is preferably triggered herein. A "seating force acting on the seat bottom" herein is in particular to be understood to be a force which a passenger exerts on the seat bottom, in particular the seating region that is implemented by the main unit, on account of the weight of said passenger. On account thereof, the adjustable sub-unit can particularly advantageously be automatically adjusted as soon as the passenger takes his/her seat on the aircraft seat.

It is furthermore proposed that the adjustable sub-unit has two connection regions, via which the sub-unit is linked to the mounting unit, wherein the connection regions are disposed in outer regions of the sub-unit. A "connection region" herein is in particular to be understood to be a region where a support element, by way of which the sub-unit is fixedly coupled to the mounting unit, is capable of being fixedly linked to the sub-unit. An "outer region of the sub-unit" herein is in particular to be understood to be a region which from a lateral edge of the sub-unit extends by less than 10 cm, preferably less than 5 cm, and in a particular advantageous design embodiment by less than 1 cm, in the transverse direction. Mounting of the adjustable sub-unit can take place in a particularly advantageous manner on account thereof, and support elements for linking to the mounting unit can be disposed in advantageous regions that do not disturb a passenger.

It is moreover proposed that the adjustable sub-unit is implemented at least by a covering. A "covering" herein is in particular to be understood to be a thin woven fabric which is held by at least two lateral elements that are disposed so as to be mutually spaced apart and which forms a face on which a comfort element for configuring the additional seat face is in particular attached. The lateral elements which stretch the woven fabric herein can preferably be embodied as a contiguous frame. The adjustable sub-unit can be implemented so as to be particularly light on account thereof.

It is furthermore proposed that the adjustment of the adjustable sub-unit is coupled with an adjustment of the backrest. "Coupled with the adjustment of the backrest" herein is in particular to be understood to mean that an adjustment of the backrest between the sitting position thereof and the comfort position thereof has a direct influence on the position of the adjustable sub-unit. An adjustment of the adjustable sub-unit preferably takes place in an automated manner herein when the backrest is adjusted between the sitting position thereof and the comfort position thereof. On account thereof, the adjustment of the adjustable sub-unit can take place in an advantageous manner.

It is furthermore proposed that the backrest comprises at least one additional cushion, which in relation to the backrest is adjustable between a sitting position and a comfort position. An "additional cushion" herein is in particular to be understood to be a cushion which at least in part is separate from the backrest and of a comfort upholstery of the backrest that configures a backrest face and which is configured for being disposed in a lower backrest region so as to offer the passenger support in the lower back region when the passenger by way of his/her buttocks has moved far to the front. The additional cushion herein is advantageously connected to the backrest, in particular to a comfort upholstery or a protective cover of the backrest, and adjustable between two positions. The additional cushion is preferably embodied as a pivoting cushion which relative to the backrest can be pivoted between a comfort position and a sitting position. In principle, it also conceivable that the additional cushion by way of a linear guide is adjustable between at least two positions. A particularly advantageously comfortable backrest can be provided on account thereof.

It is furthermore proposed that the main unit of the seat bottom in the seating direction has an extent which is at least 275 mm. "At least 275 mm" herein is in particular to be understood to be at least 275 mm, preferably at most 275 mm, and in one particular advantageous design embodiment at most 300 mm. An "extent of the seat bottom in the seating direction" herein is in particular to be understood to be a seat depth in the seating direction which is available to the passenger to be seated and which is in particular measured at a height of the seat upholstery from one intersection point between the seat bottom and the backrest to a front edge of the seat bottom. The main part of the seat bottom can be implemented in a particularly advantageous manner on account thereof such that comparatively small passengers such as in particular children, can in particular be comfortably seated only on the main part of the seat bottom.

It is furthermore proposed that the actuation mechanism is configured for a purely manual actuation of the adjustable sub-unit from the stowage position into the use position. A "purely manual actuation" herein is in particular to be understood to mean that an actuation force by means of which the adjustable sub-unit is adjusted from the stowage position to the use position is formed purely by a muscular force of a user such as in particular a passenger. In a purely manual actuation herein the adjustable sub-unit is preferably gripped by means of a hand and can be moved to a corresponding position, such as in particular the use position, by a movement of the hand. On account thereof, the actuation mechanism for adjusting the adjustable sub-unit can be implemented in a particularly simple and cost-effective manner.

It is furthermore proposed that the aircraft seat device has at least one locking mechanism, which for locking the adjustable sub-unit in a use position is configured for being brought into a locking position by a seating force acting on the seat bottom. A "seating force acting on the seat bottom" herein is in particular to be understood to be a force which acts on the seat bottom and is oriented in the direction of a cabin floor, wherein the seating force herein is preferably formed by a weight force of a passenger correctly seated on the seat bottom of the aircraft seat. On account thereof, the adjustable sub-unit can advantageously be locked in the use position only when a passenger is seated on the aircraft seat, on account of which a locking action is released in a particularly advantageous manner as soon as a passenger gets up.

It is furthermore proposed that the locking mechanism has at least one actuation element, which is disposed in a seating region of the seat bottom. An "actuation element" herein is in particular to be understood to be an element which is configured for actuating the locking mechanism, in particular enables the locking mechanism such that the latter can be moved to a locking position. The actuation element herein is implemented as an element which is actuatable by a user, in particular the passenger, and which when actuated can be moved from a resting position at least to an actuation position. The actuation element herein is in particular implemented as an element which is actuatable a seating force effected by a passenger on the seating region of the seat bottom, in particular on the main unit. The actuation element is preferably implemented as a planar element which is preferably disposed so as to be centric in the seating region. In principle, it is also conceivable for the actuation element to be implemented as a bracket which spans the seating region of the seat bottom in a transverse direction which is orthogonal to the seating direction. In principle, it is also conceivable for the locking mechanism to have two or more planar actuation elements and/or two or more actuation elements that are implemented as brackets, wherein the actuation elements are disposed in different regions of the seating region, preferably in different regions in the transverse direction. In principle, it is also conceivable for the actuation element to be implemented integrally with the seat bottom, in particular to the main part of the seat bottom. It is conceivable herein for the seat bottom, in particular the main part of the seat bottom, to configure the actuation element. It is conceivable herein for the entire seat bottom, in particular the main part of the seat bottom, upon actuation, in particular by a passenger being seated, to carry out a movement in a vertical direction. On account thereof, the locking mechanism can be implemented in a particularly advantageous simple manner so as to be actuated by a seating force.

It is furthermore proposed that the actuation element spans at least 30% of a seating sub-region of the main unit of the seat bottom. On account thereof, the actuation element can be implemented in a particularly advantageous manner. The actuation element herein spans at least 30% of a face of the seating sub-region. "At least 30%" herein is to be understood in particular to be at least 30%, preferably at least 40%, and in one particular advantageous design embodiment at least 50%.

It is furthermore proposed that the aircraft seat device has at least one delay module which, following a discontinuation of a holding force, is configured for holding the adjustable sub-unit in the use position for at least a defined temporal interval. A "delay module" herein is in particular to be understood to be a module which comprises at least one damper element such as, in particular, a spring element which is configured for providing a force which directly or indirectly holds the adjustable sub-unit in the use position at least for a defined temporal interval. The delay module is in particular configured for preventing an adjustment of the adjustable sub-unit from the use position to the stowage position during the defined temporal interval. It is conceivable herein that a force exerted by the delay module acts directly on the adjustable sub-unit and thus holds the latter temporarily in the stowage position, or that a force exerted by the delay module acts on an element of the locking mechanism and thus prevents unlocking of the unlocking unit for a defined temporal interval such that the adjustable sub-unit remains locked in the use position for said defined temporal interval. A "holding force" herein is in particular to be understood to be a force which acts on the adjustable sub-unit in order for the latter to be held in the use position, wherein the holding force herein is preferably introduced into the adjustable sub-unit by way of the support module. A "locking force" herein is in particular be understood to be a force which for locking acts on an element of the locking unit, in particular on the actuation element of the locking unit, wherein the locking force herein is preferably implemented as a seating force of a passenger seated on the aircraft seat. A "defined temporal interval" herein is in particular to be understood a temporal duration in a range from 1 second to 30 seconds. "Holding in the use position for a defined temporal interval" herein is in particular to be understood holding for said defined temporal interval and thereafter releasing such that the adjustable sub-unit upon expiry of the temporal interval is repositioned from the use position to the stowage position. The adjustable sub-unit can thus still be held in the use position when a passenger briefly gets up from the aircraft seat or moves his/her weight such that a locking action of the locking unit is cancelled, for example when the passenger wishes to assume another sitting position. A comfort of the aircraft seat device can be advantageously enhanced on account thereof.

The aircraft seat device according to the invention herein is not to be limited to the application and embodiment described above. In particular, the aircraft seat device according to the invention for meeting a functional mode described herein can have a number of individual elements, components, and units which deviate from a number mentioned herein.

DRAWINGS

Further advantages are derived from the following description of the drawings. Five exemplary embodiments of the invention are illustrated in the drawing. The drawing, the description, and the claims include numerous features in combination. The person skilled in the art will expediently also consider the features individually and combine said features so as to form meaningful further combinations.

DESCRIPTION OF THE EXEMPLARY EMBODIMENTS

Figure 1:
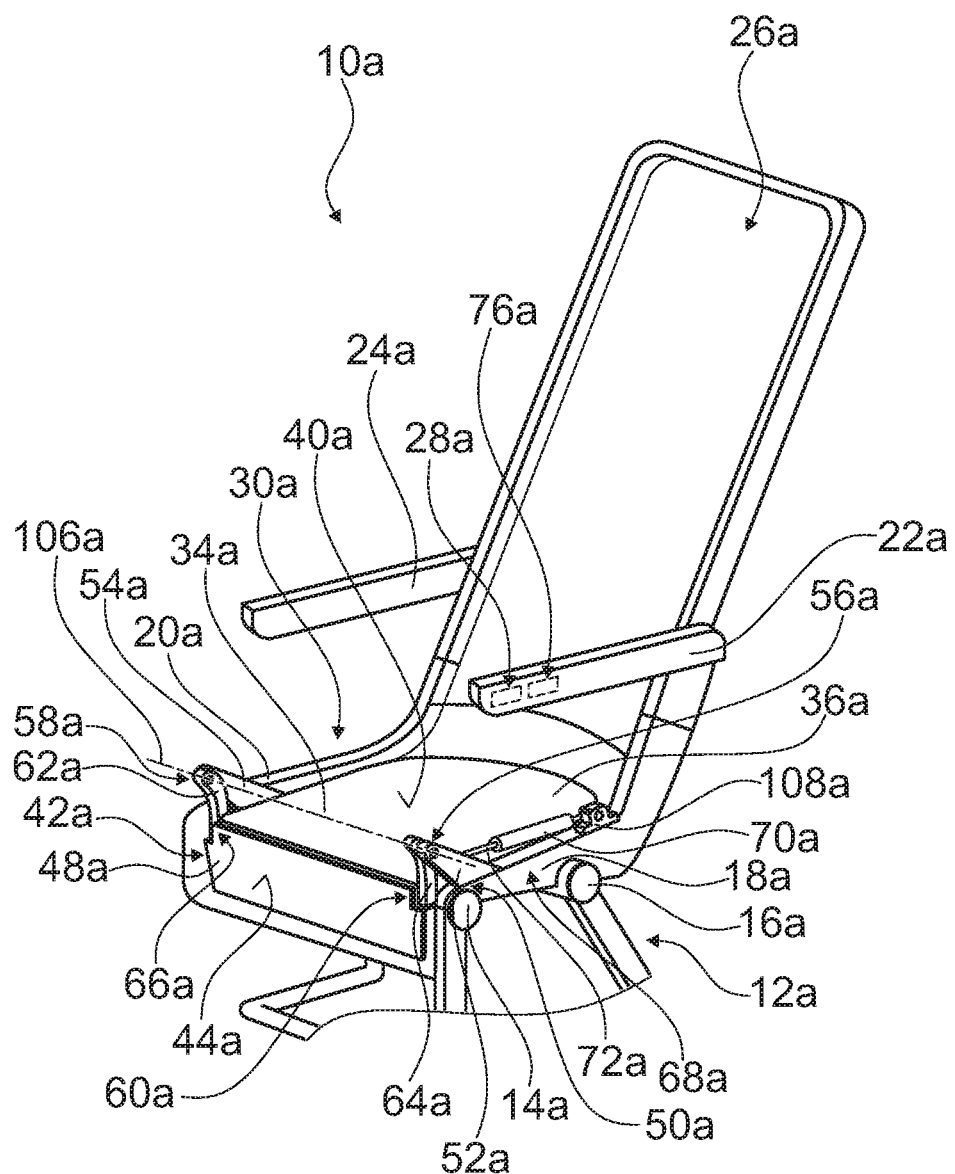
FIG. 1 shows a schematic illustration of an aircraft seat having an aircraft seat device in a first exemplary embodiment, having an adjustable sub-unit in the stowage position thereof.

FIGS. 1 to 4 show a first exemplary embodiment of an aircraft seat device according to the invention. The aircraft seat device is embodied as part of an aircraft seat 10a. The aircraft seat device comprises a mounting unit 12a by way of which the aircraft seat 10a is attached on a cabin floor of an aircraft cabin. The aircraft seat 10a herein is preferably implemented as part of a seat row not illustrated in more detail. However, in principle it is also conceivable for the aircraft seat 10a to be embodied as an individual seat. The aircraft seat 10a is coupled to the cabin floor by means of the mounting unit 12a. The aircraft seat 10a by means of the mounting unit 12a is capable of being placed on a stand on a stand plane. The cabin floor configures the stand plane. The mounting unit 12a has seat feet which for assembly in the aircraft cabin are fixedly connected to guide rails in the cabin floor by way of connection elements. The aircraft seat device comprises two transverse supports 14a, 16a. The transverse supports 14a, 16a are embodied as tubular supports. The transverse supports 14a, 16a are part of the mounting unit 12a and run in the transverse direction of the aircraft seat 10a. In principle, it would also be conceivable for the aircraft seat device to have another number of transverse supports 14a, 16a, for example a single transverse support. The aircraft seat device comprises two seat dividers 18a, 20a which laterally delimit the aircraft seat 10a. The seat dividers 18a, 20a are connected to the transverse supports 14a, 16a. The seat dividers 18a, 20a herein are implemented so as to correspond substantially to the prior art and are therefore not described in more detail. The aircraft seat device comprises two armrests 22a, 24a. The armrests 22a, 24a are in each case attached to a seat divider 18a, 20a of the aircraft seat device. The armrests 22a, 24a are in each case mounted so as to be pivotable on the respective seat divider 18a, 20a.

The aircraft seat device comprises a backrest 26a. The backrest 26a is disposed on a rear end of the aircraft seat 10a. The backrest 26a configures a backrest face on which a passenger seated on the aircraft seat 10a can rest his/her back. The backrest 26a is coupled to the mounting unit 12a. The backrest 26a is pivotably coupled to the mounting unit 12a. The backrest 26a herein is adjustable between a sitting position in which the backrest 26a is oriented so as to be substantially upright and a comfort position in which the backrest 26a is inclined in relation to the stand plane. The aircraft seat device has a bearing unit (not illustrated in more detail) and an actuation device for adjusting the backrest 26a. The actuation device for adjusting the backrest 26a comprises an actuation element 28a by way of which the actuation device is actuatable and the backrest 26a thus is adjustable between the sitting position thereof and the stowage position thereof. The actuation element 28a is implemented as a pushbutton and disposed in the armrest 22a. The actuation element 28a herein is disposed on an internal side of the armrest 22a on account of which said actuation element 28a is readily operable by a passenger. A bearing unit and an actuation device for adjusting the backrest 26a herein correspond to those which are known to the person skilled in the art from the prior art and are therefore not to be explained in more detail here.

The aircraft seat device comprises a seat bottom 30a. The seat bottom 30a is configured to implement a seating region 32a for a passenger seated on the aircraft seat 10a. The seat bottom 30a is coupled to the mounting unit 12a. The seat bottom 30a has a main unit 34a. The main unit 34a of the seat bottom 30a configures a seating region 40a. The seating region 40a of the main unit 34a herein is implemented so as to be so large that a person can be comfortably seated thereon. The main unit 34a of the seat bottom 30a has a base body 36a. The base body 36a is embodied as a seat shell. The base body 36a is coupled to the mounting unit 12a. The base body 36a is movably connected to the mounting unit 12a, The base body 36a is coupled to the backrest 26a. In an adjustment of the backrest 26a between the sitting position and the comfort position, the base body 36a and thus the main unit 34a of the seat bottom 30a are likewise displaced between a sitting position and a comfort position. The main unit 34a herein is pivoted about the front transverse support 14a of the mounting unit 12a. The main unit 34a has an upholstery unit 38a. The upholstery unit 38a is fixedly linked on the base body 36a of the main unit 34a, The upholstery unit 38a herein is formed from a foam material and a cover. The upholstery unit 38a configures the seating region 40a of the main unit 34a.

The seat bottom 30a has a sub-unit 42a. The sub-unit 42a of the seat bottom 30a is implemented as an adjustable sub-unit 42a. The adjustable sub-unit 42a in relation to the mounting unit 12a is adjustable between a stowage position and a use position. The adjustable sub-unit 42a is configured for enlarging a seating region 32a of the seat bottom 30a in one position. A seat bottom 30a that is particularly comfortable for a passenger can be provided on account thereof. The adjustable sub-unit 42a for enlarging the seating region 32a of the seat bottom 30a is configured for extending the seating region 40a of the main unit 34a of the seat face 30a. The adjustable sub-unit 42a is implemented so as to be separate from the main unit 34a. The adjustable sub-unit 42a in particular does not have any direct coupling to the main unit 34a. The adjustable sub-unit 42a is not directly linked to the main unit 34a of the seat bottom 30a. The adjustable sub-unit 42a for extending the seating region 40a of the main unit 34a configures an additional seating region 44a. The adjustable sub-unit 42a comprises an upholstery unit 46a which configures the additional seating region 44a. The upholstery unit 46a herein is formed from a foam material and a cover. The adjustable sub-unit 42a comprises a base body 48a. The base body 48a is formed by a torsion element 102a and a spring steel sheet 104a that is connected to the torsion element 102a. The torsion element 102a is formed by a torsion bar. The torsion element 102a herein is implemented as an elongate bar having a rectangular cross section. In principle, other cross section such as, for example, a triangular cross-section or a round cross-section, are also conceivable here. The torsion element 102a herein extends across an entire width of the adjustable sub-unit 42a. In principle, it is also conceivable for the torsion element 102a to be implemented so as to be U-shaped. The spring steel sheet 104a is connected to the torsion element 102a. The spring steel sheet 104a herein is riveted to the torsion element 102a. In principle, it is also conceivable for the spring steel sheet 104a to be fixedly connected to the torsion element 102a in another way, for example by adhesive bonding or screw-fitting. The spring steel sheet 104a configures a main part of the base body 48a of the adjustable sub-unit 42a. On account thereof, the adjustable sub-unit 42a can be implemented in a particularly advantageous and in particular partially resilient manner such that an optimal comfort can be achieved for a passenger since the adjustable sub-unit 42a can be advantageously adapted to the passenger. The upholstery unit 46a of the adjustable sub-unit 42a is linked to the base body 48a. The upholstery unit 46a encloses the base body 48a of the adjustable sub-unit 42a to an at least substantial extent.

The adjustable sub-unit 42a is disposed so as to be pivotable relative to the mounting unit 12a. The adjustable sub-unit 42a is articulated on the mounting unit 12a. The aircraft seat device has a bearing module 50a for linking the adjustable sub-unit 42a to the mounting unit 12a. By way of the bearing module 50a the adjustable sub-unit 42a of the seat bottom 30a is mounted so as to be pivotable to the mounting unit 12a and, on account thereof, also to the main unit 34a of the seat bottom 30a. By way of the bearing module 50a the adjustable sub-unit 42a of the seat bottom 30a is adjustable between the stowage position of said sub-unit 42a and the use position of said sub-unit 42a. The bearing module 50a has two bearing blocks 52a, 54a, One of the bearing blocks 52a, 54a is in each case linked to a seat divider 18a, 20a. On account thereof, the bearing blocks 52a, 54a are disposed in a lateral region of the seat bottom 30a. The bearing blocks 52a, 54a are rigidly connected to the respective seat divider 18a, 20a. The bearing blocks 52a, 54a extend upward from the respective seat divider 18a, 20a, away from a stand plane. The bearing blocks 52a, 54a are implemented so as to be integral to the respective seat divider 18a, 20a. The bearing blocks 52a, 54a are molded to the respective seat divider 18a, 20a. In principle, it is also conceivable for the bearing blocks 52a, 54a to be implemented so as to be separate from the seat dividers 18a, 20a and be assembled on the respective seat divider 18a, 20a by means of a form-fitting, force-fitting and/or force-fitting connection such as, for example a screw connection. The bearing blocks 52a, 54a have in each case one bearing accommodation 56a, 58a. The bearing module 50a has two holding arms 60a, 62a which are pivotably linked to the bearing accommodations 56a, 58a of the bearing blocks 52a, 54a. The bearing accommodations 56a, 58a are embodied as through bores. The bearing accommodations 56a, 58a herein are implemented so as to be mutually coaxial. The bearing accommodations 56a, 58a herein configure a pivot axis 106a about which the adjustable sub-unit 42a is pivotably mounted. The pivot axis 106a about which the adjustable sub-unit 42a is pivotable in the comfort position of the main unit 34a of the seat bottom 30a herein is disposed in a center of a front edge of the main unit 34a of the seat bottom 30a. The holding arm 60a, 62a are rotatably linked to the bearing accommodations 56a, 58a by way of bearing elements (not illustrated in more detail). The bearing elements herein are preferably embodied as bearing pins. The holding arms 60a, 62a are thus mounted by way of a friction bearing so as to be pivotable in relation to the bearing blocks 52a. 54a.

The adjustable sub-unit 42a has two connection regions 64a, 66a, The connection regions 64a, 66a are configured in order for the holding arms 60a, 62a of the bearing module 50a to be linked to said connection regions 64a, 66a, The adjustable sub-unit 42a is coupled to the bearing module 50a by way of the connection regions 64a, 66a. The adjustable sub-unit 42a is connected to the mounting unit 12a by way of the connection regions 64a, 66a. The connection regions 64a, 66a herein are in each case disposed in outer regions of the adjustable sub-unit 42a, or of the main unit 34a of the seat bottom 30a, respectively. The connection regions 64a, 66a are implemented by the base body 48a of the sub-unit 42a, The connection regions 64a, 66a are implemented by the torsion element 102a of the base body 48a. The holding arms 60a, 62a by way of the connection regions 64a, 66a are rigidly connected to the base body 48a and thus to the adjustable sub-unit 42a.

Figure 2:
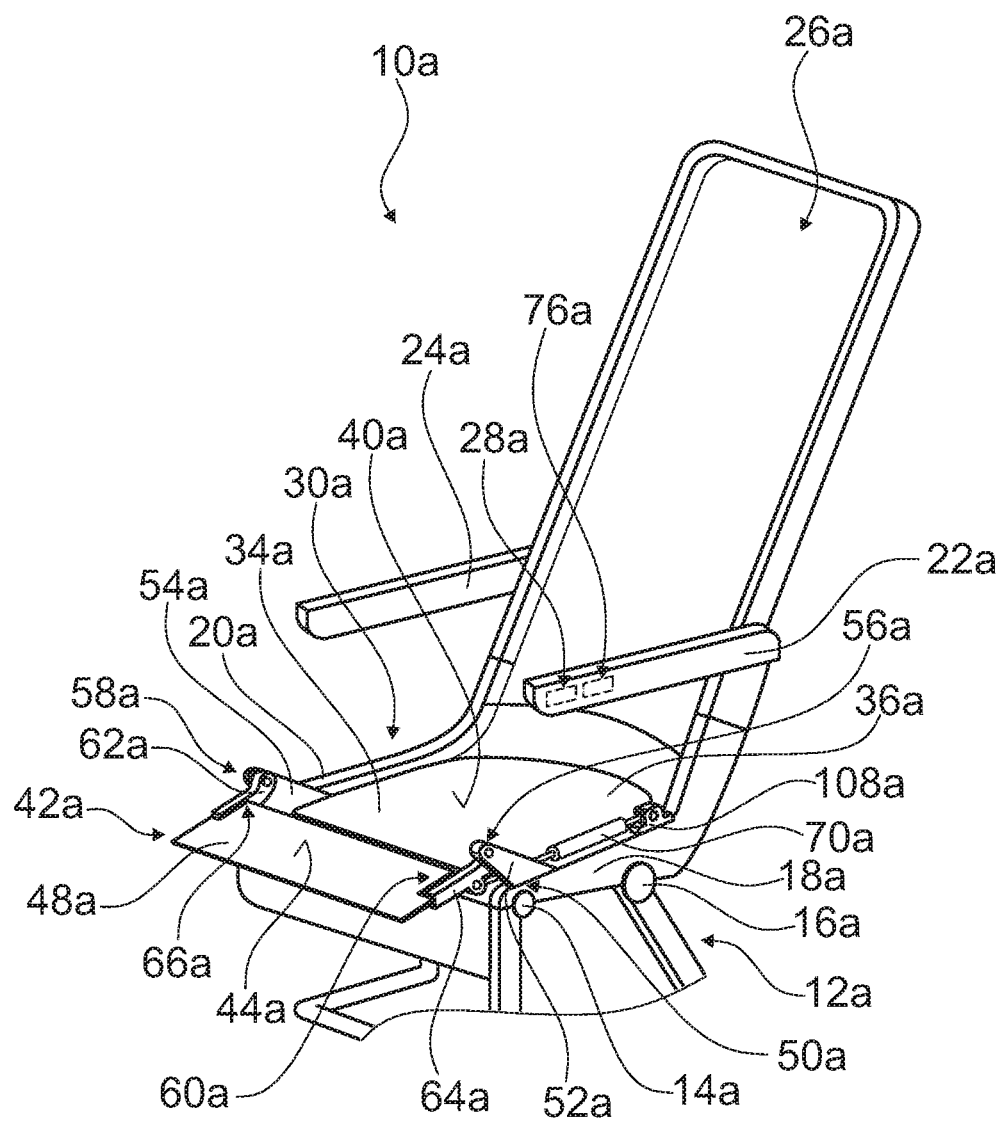
FIG. 2 shows a schematic illustration of the aircraft seat having an aircraft seat device, having an adjustable sub-unit in the use position thereof.
Figure 3:
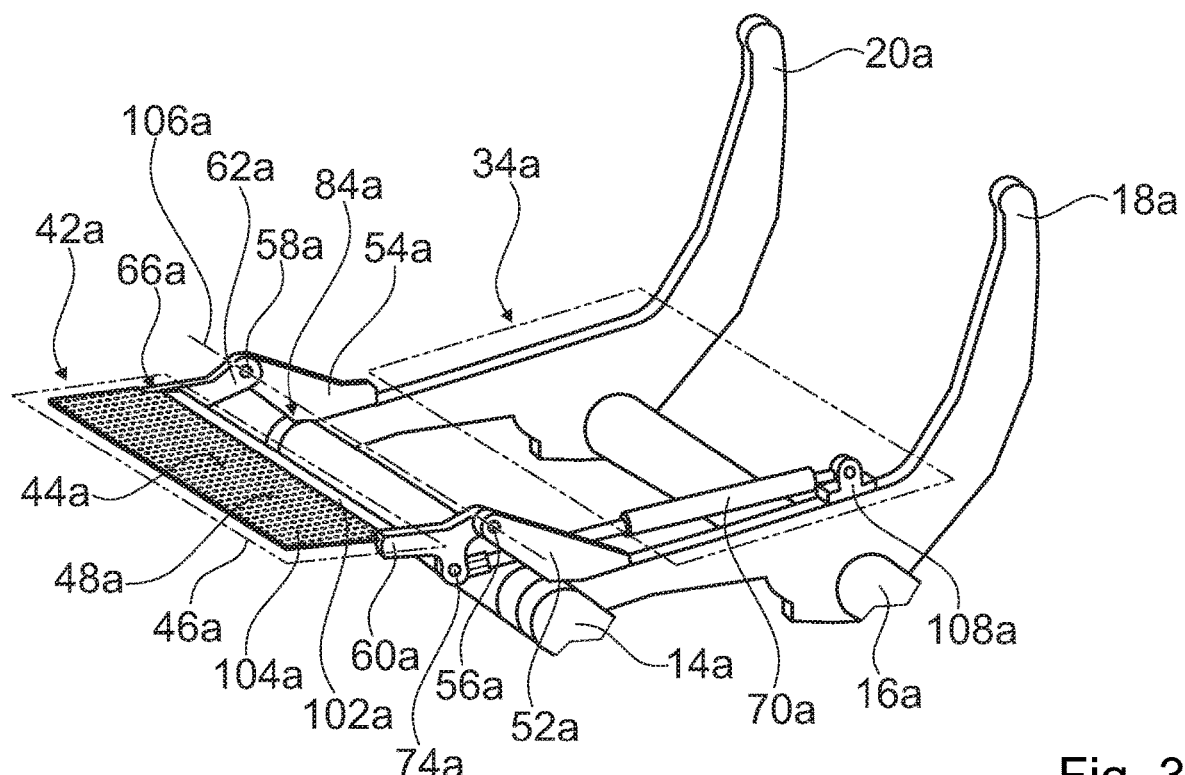
FIG. 3 shows a schematic view of a detail of part of the aircraft seat having an aircraft seat device, having an adjustable sub-unit in the use position thereof.
Figure 4:
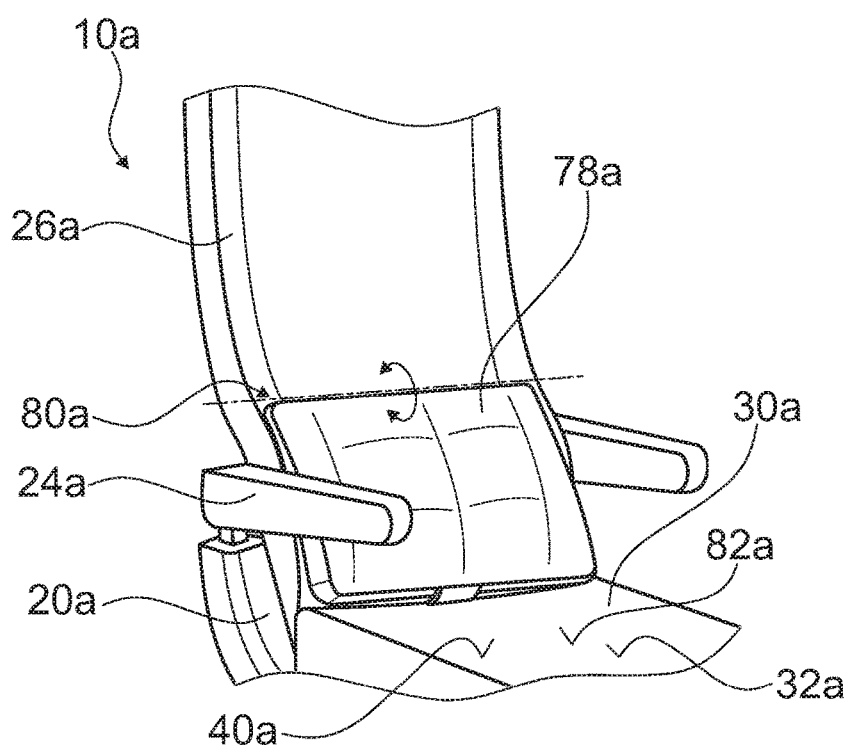
FIG. 4 shows a schematic illustration of the aircraft seat having a backrest and a cushion.

By means of the bearing module 50a the adjustable sub-unit 42a is pivotable between the stowage position thereof and the use position thereof. The stowage position of the adjustable sub-unit 42a is shown in FIG. 1. The adjustable sub-unit 42a in the stowage position is pivoted downward in the direction of the stand plane. The adjustable sub-unit 42a in the stowage position is oriented so as to be substantially vertical. The adjustable sub-unit 42a in the stowage position is disposed below the seating region 40a of the main unit 34a, or of the seating region 32a of the seat bottom 30a, respectively. In the stowage position of the adjustable sub-unit 42a the seating region 40a of the main unit 34a configures the seating region 32a of the seat bottom 30a. The use position of the adjustable sub-unit 42a is shown in FIG. 2. The adjustable sub-unit 42a in the use position is pivoted upward, away from the stand plane. The adjustable sub-unit 42a in the use position is oriented so as to be substantially horizontal. The adjustable sub-unit 42a in the use position is disposed so as to be substantially level with the seating region 40a of the main unit 34a. In the use position the additional seating region 44a of the adjustable sub-unit 42a, conjointly with the seating region 40a of the main unit 34a, configures the seating region 32a of the seat bottom 30a. The use position which is illustrated in FIG. 2 and in FIG. 3, in which the sub-unit 42a is oriented so as to be substantially horizontal and substantially parallel to the main unit 34a of the seat bottom 30a, is implemented as a maximum use position. The adjustable sub-unit 42a is capable of being pivoted and blocked in a stepless manner between the maximum use position and a minimum use position. The minimum use position herein is implemented as a position in which the adjustable sub-unit 42a from the stowage position thereof is pivoted by 5 degrees in the direction of the maximum use position.

The aircraft seat device comprises an actuation mechanism 68a. The actuation mechanism 68a is configured for adjusting the adjustable sub-unit 42a between the stowage position thereof and the maximum use position thereof. The actuation mechanism 68a is configured for actuating the adjustable sub-unit 42a. The actuation mechanism 68a comprises an actuator element 70a, The actuator element 70a is embodied as a spring element. The actuator element 70*a* is embodied as an adjustable gas pressure spring. The actuation mechanism 68*a* by way of the actuator element 70*a* is implemented for pivoting the adjustable sub-unit 42*a*. The actuator element 70*a* in an actuated state is configured for exerting an actuation force on the adjustable sub-unit 42*a*. The actuation force acting from the actuator element 70*a* on the adjustable sub-unit 42*a* is configured for pivoting the adjustable sub-unit 42*a* to the maximum use position thereof. The actuator element 70*a* is disposed above the mounting unit 12*a*. The actuator element 70*a* is disposed above the seat dividers 18*a*, 20*a*. The actuator element 70*a* is linked on an upper side of a sub-region of the seat divider 18*a* that connects the two transverse supports 14*a*, 16*a* of the mounting unit 12*a*. The actuator element 70*a* is connected to the seat divider 18*a* by way of a connection block 108*a*. The connection block 108*a* is implemented integrally with the seat divider 18*a*. In principle, it is also conceivable for the connection block 108*a* to be implemented so as to be separate from the seat dividers 18*a* and be assembled on the seat divider 18*a* by means of a form-fitting, force-fitting and/or force-fitting connection such as, for example, a screw connection. The actuator element 70*a* by way of a first end is linked to the seat divider 18*a*. A second end of the actuator element 70*a* is implemented by an axially displaceable actuation rod 72*a* of the actuator element 70*a*. The actuation rod 72*a* is linked to the holding arm 60*a* of the bearing module 50*a*. On account thereof, an actuation force of the actuator element 70*a* is transmitted to the adjustable sub-unit 42*a* by way of the holding arm 60*a*. The actuator element 70*a* herein is linked by way of a connection point 74*a* of the holding arm 60*a*, said connection point 74*a* being disposed below the pivot axis 106*a* which configures the bearing module 50*a* for pivotably mounting the adjustable sub-unit 42*a*. On account thereof, the actuation force that acts from the actuator element 70*a* on the holding arm 60*a* generates a torque which pivots the holding arm 60*a*, and on account thereof the adjustable sub-unit 42*a* fastened thereto, upward, in particular in the direction of the maximum use position of said sub-unit 42*a*.

The actuation mechanism 68*a* has an actuation element 76*a*. The adjustable sub-unit 42*a* is adjustable by a passenger by means of the actuation element 76*a*. The actuation element 76*a* is implemented as a pushbutton and disposed in the armrest 22*a*, The actuation element 76*a* herein is disposed on an internal side of the armrest 22*a* on account of which said actuation element 76*a* is particularly easy to be operated by a passenger. In principle, it is likewise conceivable for the actuation element 76*a* to be disposed in another region of the aircraft seat 10*a* or, for example, on elements which are disposed in an aircraft seating region, such as in particular in a console. In principle, it is likewise conceivable that the actuation element 76*a* is implemented as a traction element, for example. It would furthermore be conceivable herein for the actuation element 76*a* to be disposed in a region of the adjustable sub-unit 42*a*, in particular in a region between the adjustable sub-unit 42*a* and the main unit 34*a* of the seat bottom 30*a*. An advantageously simple and intuitive operation of the adjustable sub-unit 42*a* could be performed on account thereof. The actuation element 76*a* for adjusting the adjustable sub-unit 42*a* of the seat bottom 30*a* herein is disposed directly beside the actuation element 28*a* for adjusting the backrest 26*a*, The actuation element 76*a* for adjusting the adjustable sub-unit 42*a* of the seat bottom 30*a* herein is disposed directly below the actuation element 28*a* for adjusting the backrest 26*a* such that an intuitive operation of the backrest 26*a* and adjustable sub-unit 42*a* of the seat bottom 30*a* is provided to the passenger. The actuation element 76*a* is coupled to the actuator element 70*a* by way of a coupling element (not illustrated in more detail). The coupling element herein is embodied as a Bowden cable. By pressing the actuation element 76*a* that is implemented as a pushbutton, a passenger can move the actuation element 76*a* to an actuation position. The actuation element 76*a* in the actuation position actuates the actuator element 70*a*. The actuator element 70*a* in the actuated position exerts the actuation force on the adjustable sub-unit 42*a*. If the actuation force which the actuator element 70*a* exerts on the adjustable sub-unit 42*a* is greater than a force that counteracts the actuation force, said counteracting force being formed by a seating force acting on the sub-unit 42*a* for example, the actuator element 70*a* adjusts the adjustable sub-unit 42*a* in the direction of the maximum use position of the latter. If the actuation element 76*a* is not in the actuation position thereof, the actuator element 70*a* is not actuated and is in a locking position. In the locking position, the actuation rod 72*a* of the actuator element 70*a* is locked and cannot be axially displaced. On account thereof, the adjustable sub-unit 42*a* is blocked in the locking position of the actuator element 70*a*. On account thereof, the adjustable sub-unit 42*a* by means of the actuation mechanism 68*a* is capable of being blocked in a stepless manner in each position between the stowage position of said sub-unit 42*a* and the maximum use position of said sub-unit 42*a*.

The seat bottom 30*a* has a protective cover 82*a*. The protective cover 82*a* stretches around the main unit 34*a* and the adjustable sub-unit 42*a* of the seat bottom 30*a*. The protective cover 82*a* herein represents the single direct connection between the main unit 34*a* and the adjustable sub-unit 42*a*. In principle, it would also be conceivable for the main unit 34*a* and the adjustable sub-unit 42*a* to have in each case a dedicated separate protective cover. A gap 84*a* is disposed between the main unit 34*a* and the adjustable sub-unit 42*a* in the maximum use position. The gap 84*a* mutually separates the main unit 34*a* and the adjustable sub-unit 42*a*. The protective cover 82*a* spans the gap 84*a*. On account thereof, the protective cover 82*a* configures a seating face that is comfortable for a passenger.

The adjustable sub-unit 42*a* by way of the actuation mechanism 68*a* is pivotable by a passenger between the stowage position of said sub-unit 42*a* and the maximum use position of said sub-unit 42*a*. If a passenger is seated on the aircraft seat 10*a* and the adjustable sub-unit 42*a* is in the stowage position thereof, the passenger for sitting has available only the seating region 40*a* of the main unit 34*a* as the seating region 32*a* of the seat bottom 30*a*. The passenger can pivot the adjustable sub-unit 42*a* to the use position thereof by actuating the actuation element 76*a* of the actuation mechanism 68*a*. The passenger herein must not exert any force on the adjustable sub-unit 42*a* that is greater than the actuation force of the actuator element 70*a* and acts counter thereto. The passenger can stop an adjustment of the adjustable sub-unit 42*a* in each arbitrary position between the stowage position and the use position by releasing the actuation element 76*a*. In order for the adjustable sub-unit 42*a* to be returned from a use position to the stowage position, the passenger has to actuate the actuation element 76*a* and exert a force on the adjustable sub-unit 42*a* that counteracts the actuation force of the actuator element 70*a*, and thus push the adjustable sub-unit 42*a* back to the stowage position thereof.

The backrest 26*a* comprises a cushion 78*a* which in relation to the backrest 26*a* is adjustable between a sitting position and a comfort position. The cushion 78a is implemented as a support cushion for a lower back region. The cushion 78a is preferably implemented in a wedge-shaped manner. In a sitting position in which a passenger by way of his/her buttocks has slipped far forward on the seating region 32a and in particular is partially seated on an additional seating region 44a that is implemented by the adjustable sub-unit 42a, the cushion 78a configures a support face that is offset from a back rest face embodied by the backrest 26a. A particularly advantageous and comfortable sitting position can be assumed on account thereof. The cushion 78a is implemented as an integrated cushion 78a. The cushion 78a is implemented as a folding cushion which is connected to a protective cover of the backrest 26a. The folding caution is coupled to the backrest 26a along a connection line 80a that runs in the transverse direction. The cushion 78a is pivotable along said connection line 80a.

In principle, it would also be conceivable for an adjustment of the adjustable sub-unit 42a herein to be coupled to an adjustment of the backrest 26a. It would be conceivable herein for the adjustment of the adjustable sub-unit 42a to be prevented when the backrest 26a is oriented in a TTL position, thus a maximum upright sitting position. In principle, it would also be conceivable for the adjustable sub-unit 42a to be moved to the stowage position thereof in an automated manner as soon as the backrest 26a is moved to a TTL position. In principle, it is likewise conceivable for the adjustable sub-unit 42a to be repositioned to a use position when the backrest 26a is repositioned from the sitting position thereof to a comfort position.

Four further exemplary embodiments of the invention are shown in FIGS. 5 to 13. The following descriptions and the drawings are limited substantially to the point of differentiation between the exemplary embodiments, wherein reference in terms of identically referenced components, in particular in terms of components with identical reference signs, can in principle also be made to the drawings and/or the description of the other exemplary embodiments, in particular those of FIGS. 1 to 4. In order for the exemplary embodiments to be differentiated, the letter a is used as a suffix to the reference signs of the exemplary embodiment in FIGS. 1 to 4. The letter a is replaced by the letters b to e in the exemplary embodiments of FIGS. 5 to 13.

Figure 5:
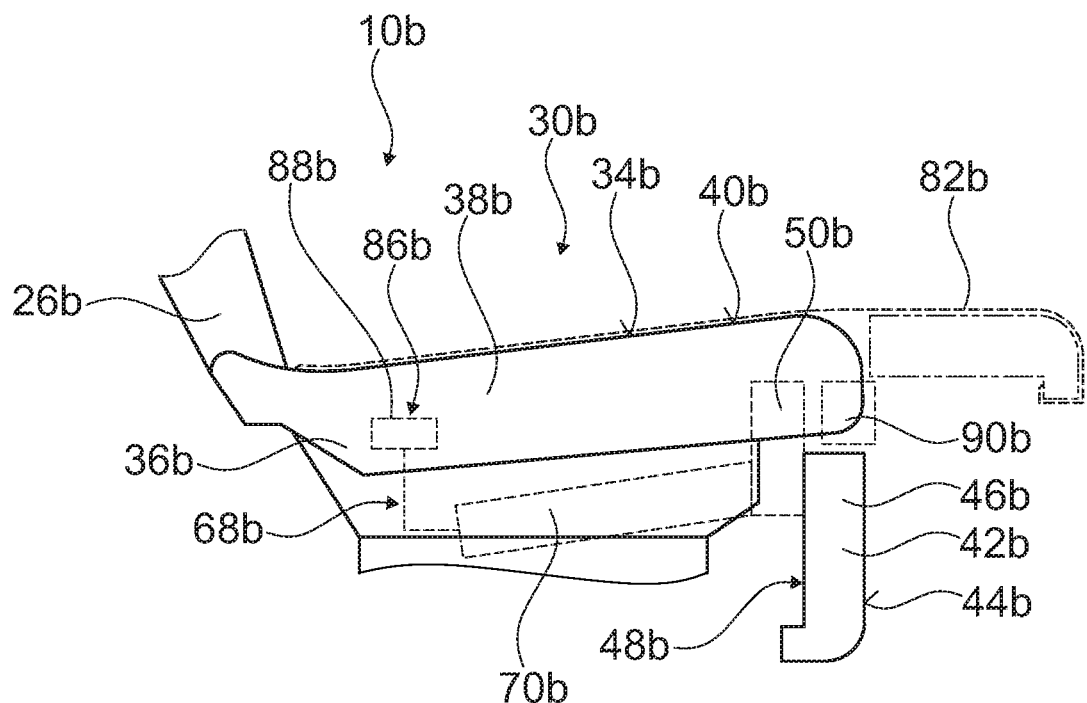
FIG. 5 shows a schematic illustration of an aircraft seat device in a second exemplary embodiment.

FIG. 5 shows a second exemplary embodiment of an aircraft seat device according to the invention. The aircraft seat device is implemented as part of an aircraft seat 10b, The aircraft seat device comprises a mounting unit 12b by means of which the aircraft seat 10b is attached on a cabin floor of an aircraft cabin. The aircraft seat device comprises a backrest 26b, The backrest 26b is disposed on a rear end of the aircraft seat 10b.

The aircraft seat device comprises a seat bottom 30b, The seat bottom 30b is configured to implement a seating region 32b for a passenger seated on the aircraft seat 10b. The seat bottom 30b is coupled to the mounting unit 12b. The seat bottom 30b has a main unit 34b. The main unit 34b of the seat bottom 30b configures the seating region 40b. The seating region 40b of the main unit 34b herein is implemented so large that a person can be comfortably seated thereon. The main unit 34b of the seat bottom 30b has a base body 36b. The main unit 34b has an upholstery unit 38b. The upholstery unit 38b is fixedly linked on the base body 36b of the main unit 34b. The upholstery unit 38b herein is formed from a foam material. The upholstery unit 38b configures the seating region 40b of the main unit 34b. The seat bottom 30b has a sub-unit 42b. The sub-unit 42b of the seat bottom 30b is implemented as an adjustable sub-unit 42b. The adjustable sub-unit 42b in relation to the mounting unit 12b is adjustable between a stowage position and a use position. The adjustable sub-unit 42b is configured for enlarging a seating region 32b of the seat bottom 30b in one position. The adjustable sub-unit 42b for enlarging the seating region 32b of the seat bottom 30b is configured for extending the seating region 40b of the main unit 34b of the seat bottom 30b. The adjustable sub-unit 42b is implemented so as to be separate from the main unit 34b. The seat bottom 30b has a protective cover 82b. The protective cover 82b stretches around the main unit 34a and the adjustable sub-unit 42b of the seat bottom 30a. The protective cover 82b herein represents the single direct connection between the main unit 34b and the adjustable sub-unit 42b.

The adjustable sub-unit 42b is disposed so as to be pivotable relative to the mounting unit 12b. The adjustable sub-unit 42b is articulated on the mounting unit 12b. The aircraft seat device has a bearing module 50b for linking the adjustable sub-unit 42b to the mounting unit 12b. The adjustable sub-unit 42b is pivotable between the stowage position thereof and the use position thereof by means of the bearing module 50b. The bearing module 50b is not illustrated in more detail but merely indicated in FIG. 5. The bearing module 50b is implemented in a manner substantially identical to the bearing module of the first exemplary embodiment and is therefore also not to be described in more detail here.

The aircraft seat device comprises an actuation mechanism 68b. The actuation mechanism 68b is configured for adjusting the adjustable sub-unit 42b between the stowage position thereof and the maximum use position. The actuation mechanism 68b is configured for actuating the adjustable sub-unit 42b. The actuation mechanism 68b comprises an actuator element 70b. The actuator element 70b is embodied as a spring element. The actuator element 70b is embodied as a gas pressure spring. The actuation mechanism 68b by way of the actuator element 70b is configured for pivoting the adjustable sub-unit 42b. The actuator element 70b and a connection to the bearing module 50b in FIG. 5 herein are illustrated only in very abstract manner since said actuator element 70b and a connection to the bearing module 50b corresponds substantially to a design embodiment from the first exemplary embodiment.

The actuation mechanism 68b is configured for automatically pivoting the adjustable sub-unit 42b from the stowage position thereof to the use position thereof when a person takes a seat on the seating region 40b implemented by the main unit 34b. The adjustable sub-unit 42b is configured for being pivoted automatically to the use position and being held there while a passenger is seated on the aircraft seat 10b. The actuation mechanism 68b adjusts the adjustable sub-unit 42b in a self-acting manner to the maximum use position when a passenger is seated on the seat bottom 30b. The actuation mechanism 68b is configured for pivoting the adjustable sub-unit 42b back to the stowage position thereof in a self-acting manner when a passenger is no longer seated on the seat bottom 30b. The actuation mechanism 68b pivots the adjustable sub-unit 42b in a self-acting manner back to the stowage position as soon as a passenger gets up from the aircraft seat 10. On account thereof, the seating region 32b of the seat bottom 30b can advantageously always be automatically enlarged when a passenger is seated on the aircraft seat 10b. On account thereof, the main unit 34b of the seat bottom 30b can advantageously be implemented so as to be shorter than would be required for an optimal comfortable size of the seating region since the seating region is automatically enlarged as soon as a passenger takes a seat on the aircraft seat 10b. On account thereof, the main unit 34b of the seat bottom 30b that is shorter in comparison to the prior art is not disadvantageous in terms of a seating comfort. However, a space-saving which is generated in front of the aircraft seat 10b in that the adjustable sub-unit 42b in an unused state of the aircraft seat 10b is folded away to the stowage position off said sub-unit 42b is advantageous. On account thereof, a passageway in front of the aircraft seat 10b can advantageously be enlarged without increasing a spacing between aircraft seats 10b disposed behind one another. On account thereof, advantageously wide escape paths can be provided in aircraft seat rows which lead to an emergency exit of an aircraft.

The actuation mechanism 68b comprises a sensor device 86b. The sensor device 86b is configured for detecting a sensor signal for adjusting the adjustable sub-unit 42b. The sensor device 86b for triggering the adjustment of the adjustable sub-unit 42b is configured for detecting a seating force acting on the seat bottom 30b. The sensor device 86b comprises a pressure sensor 88b. The pressure sensor 88b is implemented as a pressure switch. The sensor device 86b is disposed in a rear region of the main unit 34b of the seat bottom 30b. The pressure sensor 88b is disposed below an upholstery unit 38b of the main unit 34b. The pressure sensor 88b detects a seating force acting on the seat bottom 30b, in particular a seating force acting on the main unit 34b of the seat bottom 30b. The pressure sensor 88b beyond a defined limit value of the seating force acting on the seat bottom 30b switches to an actuation position. The pressure sensor 88b is coupled to the actuator element 70b. If the pressure sensor 88b is moved to an actuation position, the pressure sensor 88b actuates the actuator element 70b. The pressure sensor 88b in the actuation position actuates the actuator element 70b, The actuator element 70b in the actuated position exerts an actuation force on the adjustable sub-unit 42b. The pressure sensor 88b herein remains in the actuation position thereof as long as a passenger is seated on the seat bottom 30b.

The actuation mechanism 68b comprises a locking unit 90b which locks the adjustable sub-unit 42b in the maximum use position thereof. The locking unit 90b to this end has a locking element (not illustrated in more detail) which is enabled in an operating state in which a passenger is seated on the seat bottom 30b and exerts a seating force thereon. If the locking element is enabled, the locking element of the locking unit 90b locks the adjustable sub-unit 42b as soon as the latter is disposed in the maximum use position thereof. As soon as the passenger gets up from the seat bottom 30b and there is no longer a seating force acting on the seat bottom 30b the locking element of the locking unit 90b is locked in an unlocking position and releases the adjustable sub-unit 42b and unlocks the latter on account thereof. The adjustable sub-unit 42b is returned from the use position to the stowage position thereof in an automated manner.

Figure 6:
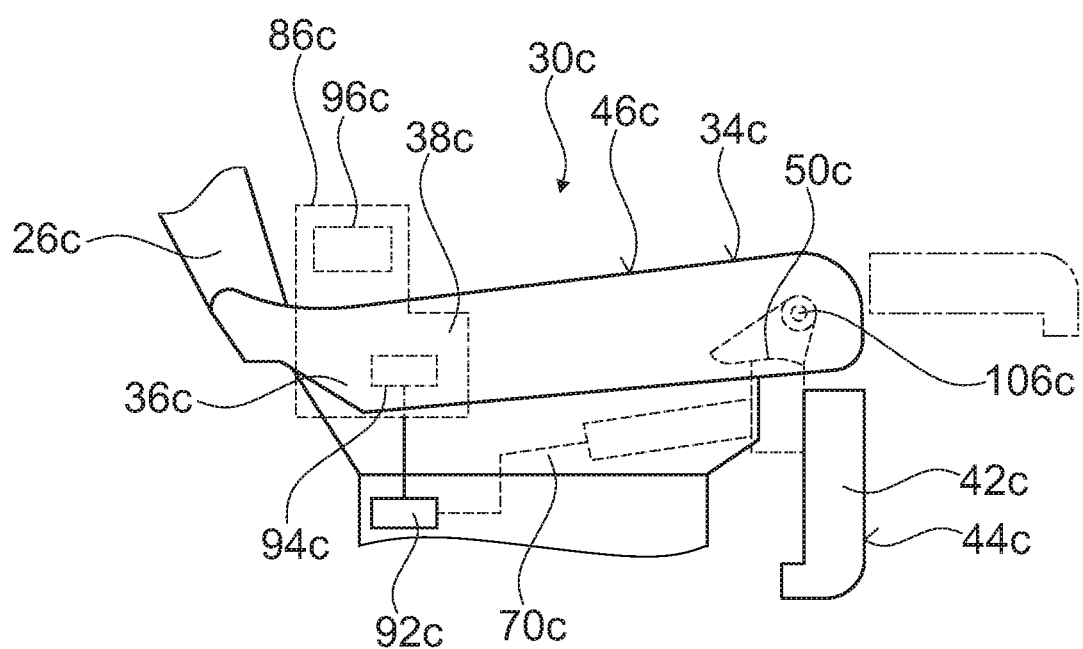
FIG. 6 shows a schematic illustration of an aircraft seat device in a third exemplary embodiment.

FIG. 6 shows a third exemplary embodiment of an aircraft seat device according to the invention. The aircraft seat device is implemented as part of an aircraft seat 10c, The aircraft seat device comprises a mounting unit 12c by means of which the aircraft seat 10c is attached on a cabin floor of an aircraft cabin. The aircraft seat device comprises a backrest 26c. The backrest 26c is disposed on a rear end of the aircraft seat 10c.

The aircraft seat device comprises a seat bottom 30c. The seat bottom 30c is configured to implement a seating region 32c for a passenger seated on the aircraft seat 10c. The seat bottom 30c is coupled to the mounting unit 12c The seat bottom 30c has a main unit 34c, The main unit 34c of the seat bottom 30c configures a seating region 40c, The seating region 40c of the main unit 34c herein is implemented so large that a person can be comfortably seated thereon. The main unit 34c of the seat bottom 30c has a base body 36c. The main unit 34c has an upholstery unit 38c. The upholstery unit 38c is fixedly linked on the base body 36c of the main unit 34c The upholstery unit 38c herein is formed from foam material. The upholstery unit 38c configures the seating region 40c of the main unit 34c. The seat bottom 30c has a sub-unit 42c. The sub-unit 42c of the seat bottom 30c is embodied as an adjustable sub-unit 42c. The adjustable sub-unit 42c in relation to the mounting unit 12c is adjustable between a stowage position and a use position. The adjustable sub-unit 42c is configured for enlarging a seating region 32c of the seat bottom 30c in one position. The adjustable sub-unit 42c for enlarging the seating region 32c of the seat bottom 30c is configured for extending the seating region 40c of the main unit 34c of the seat bottom 30c, The adjustable sub-unit 42c is implemented so as to be separate from the main unit 34c.

The adjustable sub-unit 42c is disposed so as to be pivotable relative to the mounting unit 12c, The adjustable sub-unit 42c is articulated on the mounting unit 12c. For linking the adjustable sub-unit 42c to the mounting unit 12c the aircraft seat device has a bearing module 50c. By means of the bearing module 50c the adjustable sub-unit 42c is pivotable about a pivot axis 106c between the stowage position of said sub-unit 42c and the use position of said sub-unit 42c. The bearing module 50c is not illustrated in more detail but merely indicated in FIG. 6. The bearing module 50c is implemented so as to be substantially identical to the bearing module of the first exemplary embodiment and is therefore also not to be described in more detail here.

The aircraft seat device comprises an actuation mechanism 68c. The actuation mechanism 68c is configured for adjusting the adjustable sub-unit 42c between the stowage position thereof and the maximum use position. The actuation mechanism 68c is configured for actuating the adjustable sub-unit 42c. The actuation mechanism 68c comprises an actuator element 70c. The actuator element 70c is embodied as an electric servomotor. The actuation mechanism 68c comprises a control apparatus 92c which actuates the actuator element 70c that is embodied as an electric servomotor. The adjustable sub-unit 42c can be adjusted continuously between the stowage position thereof and the maximum use position by actuating the actuator element 70c that is embodied as an electric servomotor by means of the control apparatus 92c.

The actuation mechanism 68c comprises a sensor device 86c. The sensor device 86c for adjusting the adjustable sub-unit 42c is configured for detecting a sensor signal. The sensor device 86c for triggering the adjustment of the adjustable sub-unit 42c is configured for detecting a seating force acting on the seat bottom 30c. The sensor device 86c has a pressure sensor 94c. The pressure sensor 94c is embodied as an electronic pressure sensor which emits an electronic sensor signal. The pressure sensor 94c is coupled to the control apparatus 92c. The sensor signal of the pressure sensor 94c is evaluated by the control apparatus 92c. The sensor device 86c has a further sensor element 96c, The further sensor element 96c is embodied as an input apparatus. Parameters such as, in particular, a size, a length of an upper leg, or other body-specific parameters of a passenger can be inputted by way of the sensor element 96c that is implemented as an input apparatus. The inputted parameters are transmitted in the form of a sensor signal to the control apparatus 92c and evaluated by the latter.

In principle, it is also conceivable for the sensor device 86c to comprise further sensor elements such as, for example, a camera, which transmit further sensor signals to the control apparatus 92c.

The control apparatus 92c by means of the sensor signals transmitted by the sensor device 86c and evaluated by the control apparatus 92c actuates the actuator element 70c in a corresponding manner. The control apparatus 92c by means of the actuator element 70c herein correspondingly sets the adjustable sub-unit 42c such that a seating region 32c of the seat bottom 30c of optimum size is provided to the passenger seated on the aircraft seat 10c. The control apparatus 92c herein adjusts the adjustable sub-unit 42c from the stowage position to the use position as soon as the control apparatus 92c by means of the sensor signal of the pressure sensor 94c recognizes that a passenger is seated on the seat bottom 30c, As soon as the control apparatus 92c by means of the sensor signal of the pressure sensor 94c recognizes that a passenger has got up from the seat bottom 30c the control apparatus 92c adjusts the adjustable sub-unit 42c from the use position back to the stowage position.

Figure 7:
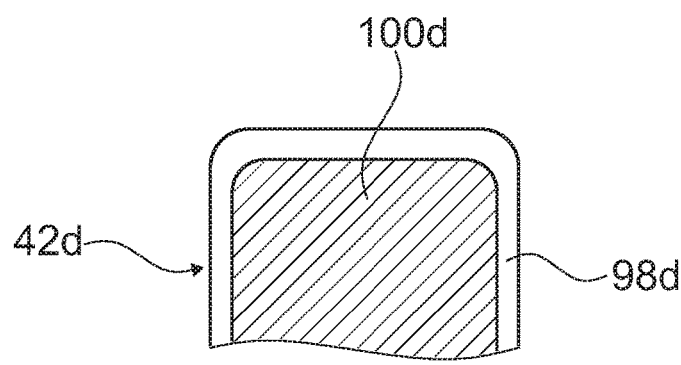
FIG. 7 shows a schematic view of an adjustable sub-unit of a seat bottom in a fourth exemplary embodiment.
Figure 8:
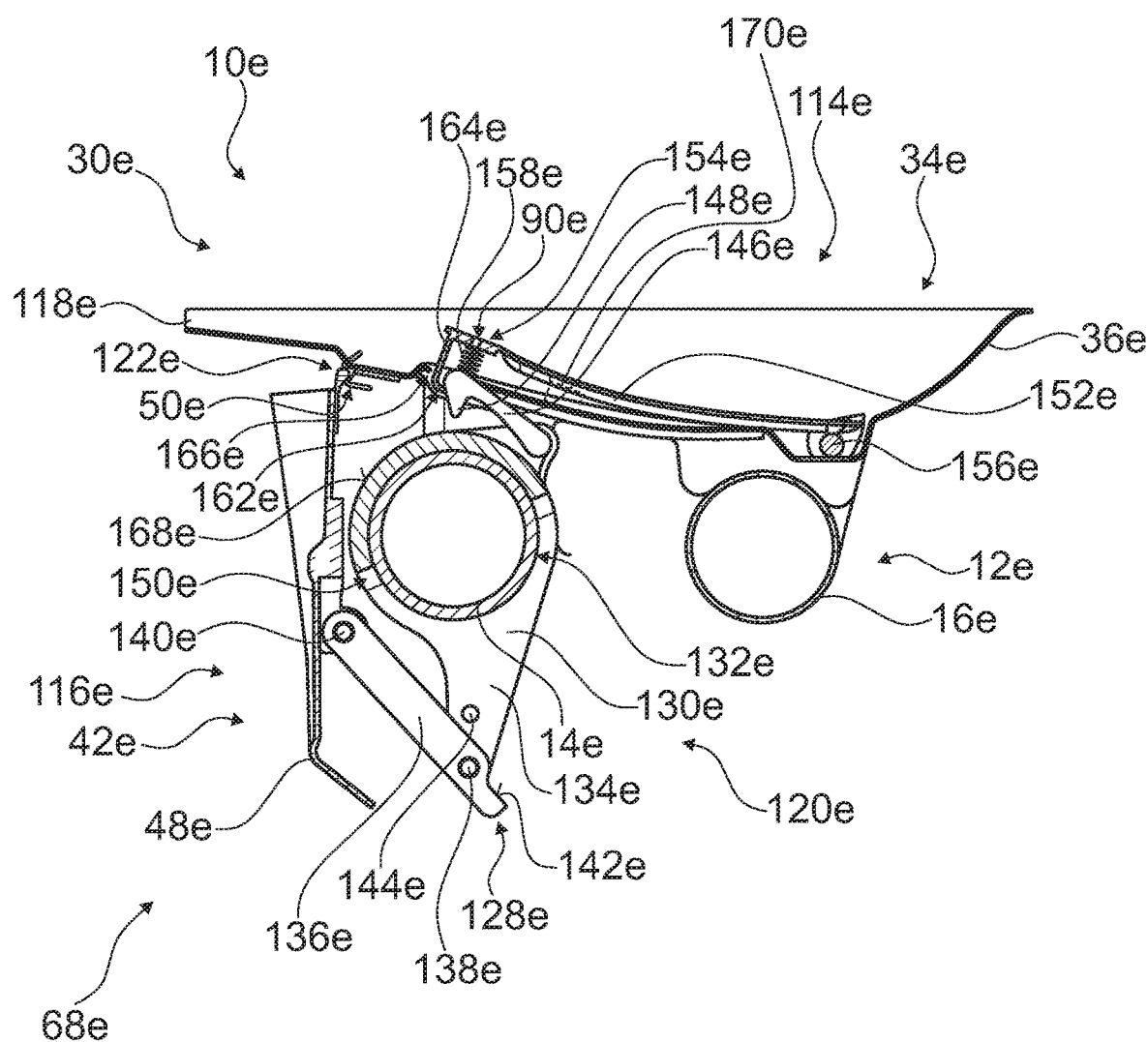
FIG. 8 shows a schematic sectional view of an aircraft seat device in a third exemplary embodiment, having an adjustable sub-unit in a stowage position and a locking unit in a release position.
Figure 9:
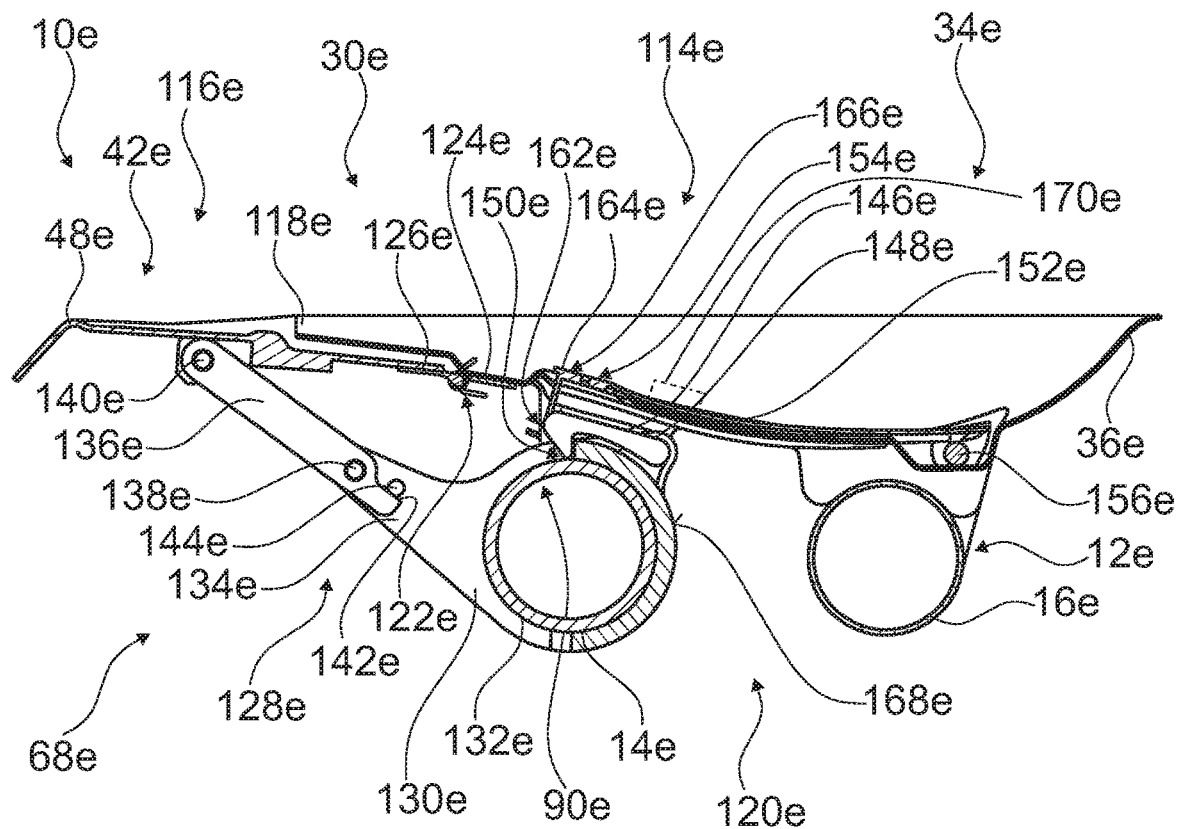
FIG. 9 shows a schematic sectional view of the adjustable sub-unit in a use position and of a locking unit in a locking position.
Figure 10:
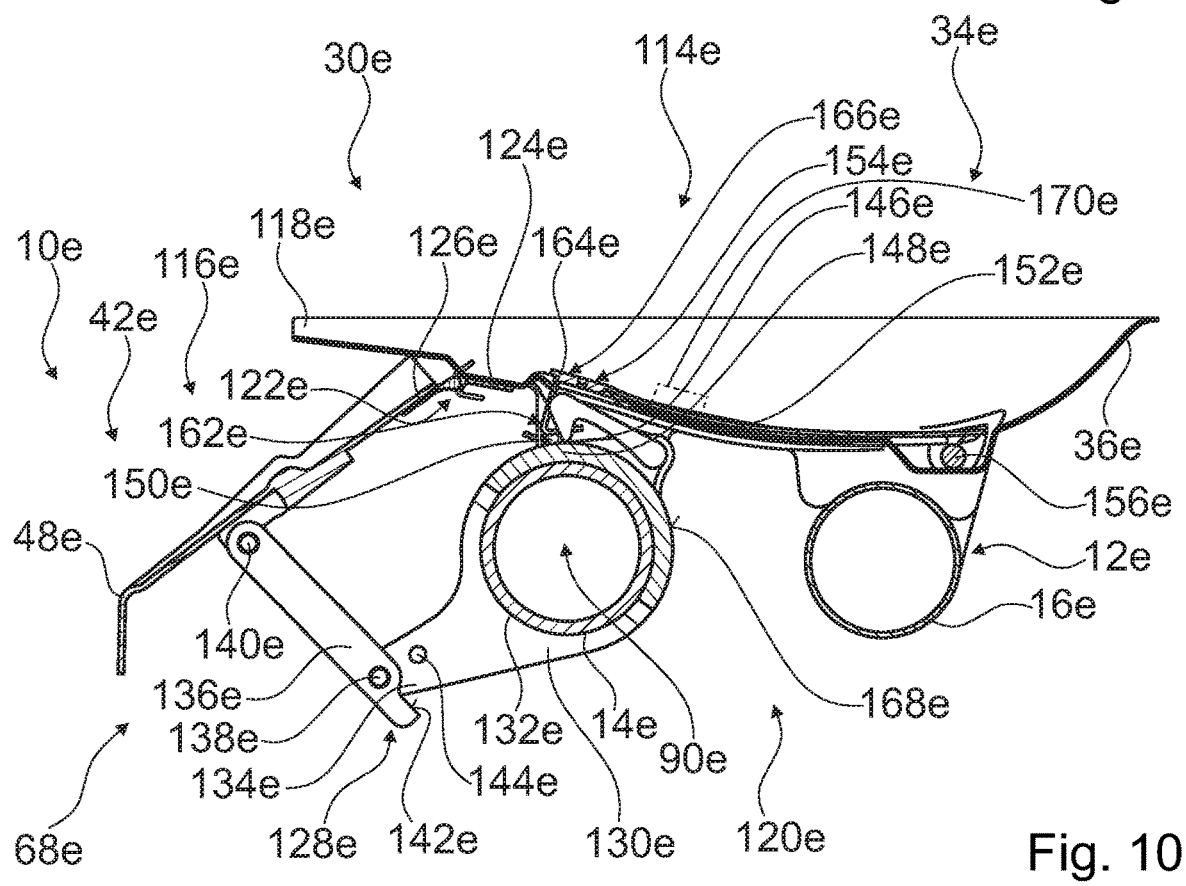
FIG. 10 shows a schematic sectional view of the adjustable sub-unit in a position between the use position and the stowage position, and of a locking unit in a locking position.
Figure 11:
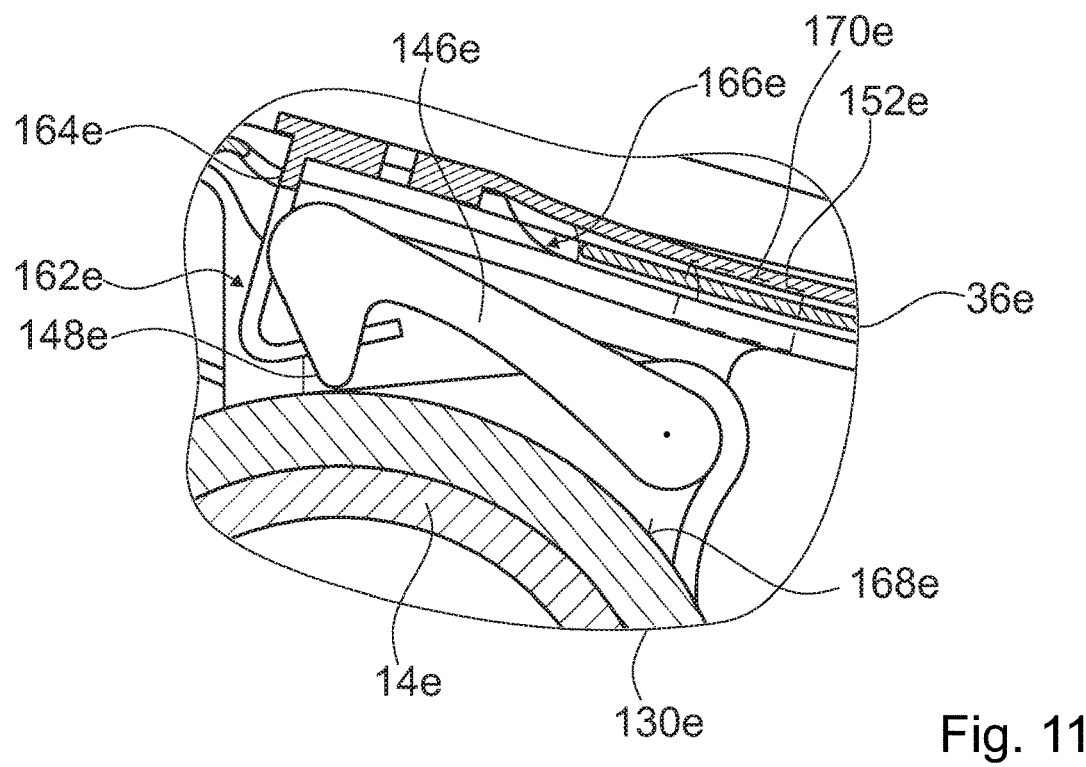
FIG. 11 shows a view of a detail of a locking element of the locking unit.
Figure 12:
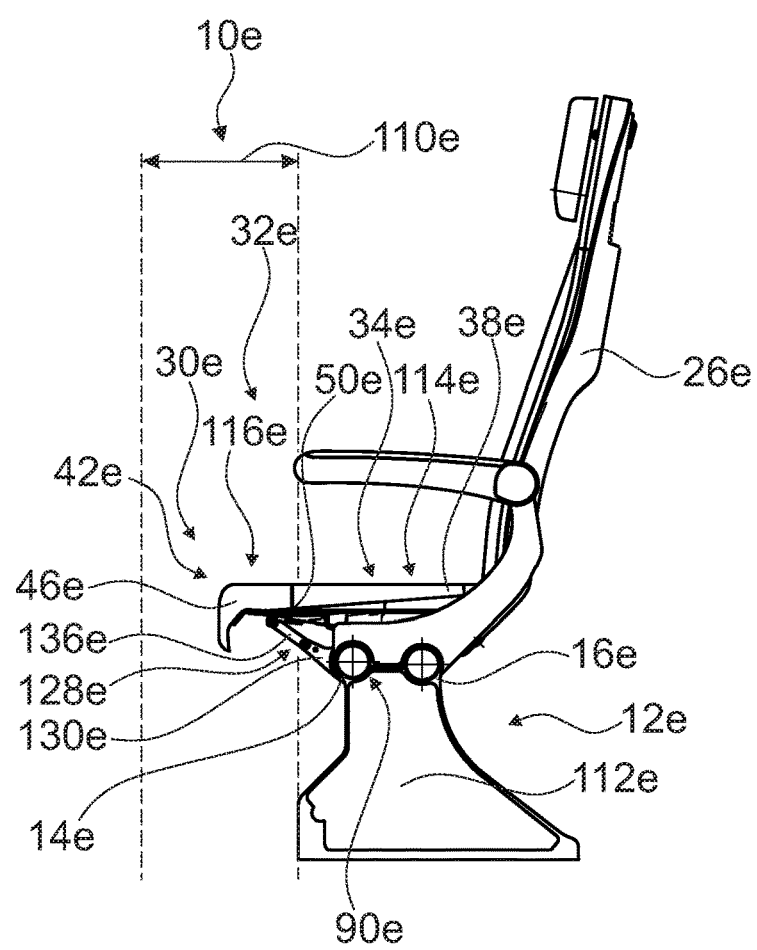
FIG. 12 shows a schematic lateral view of an aircraft seat having the aircraft seat device, and of an adjustable sub-unit in a use position.
Figure 13:
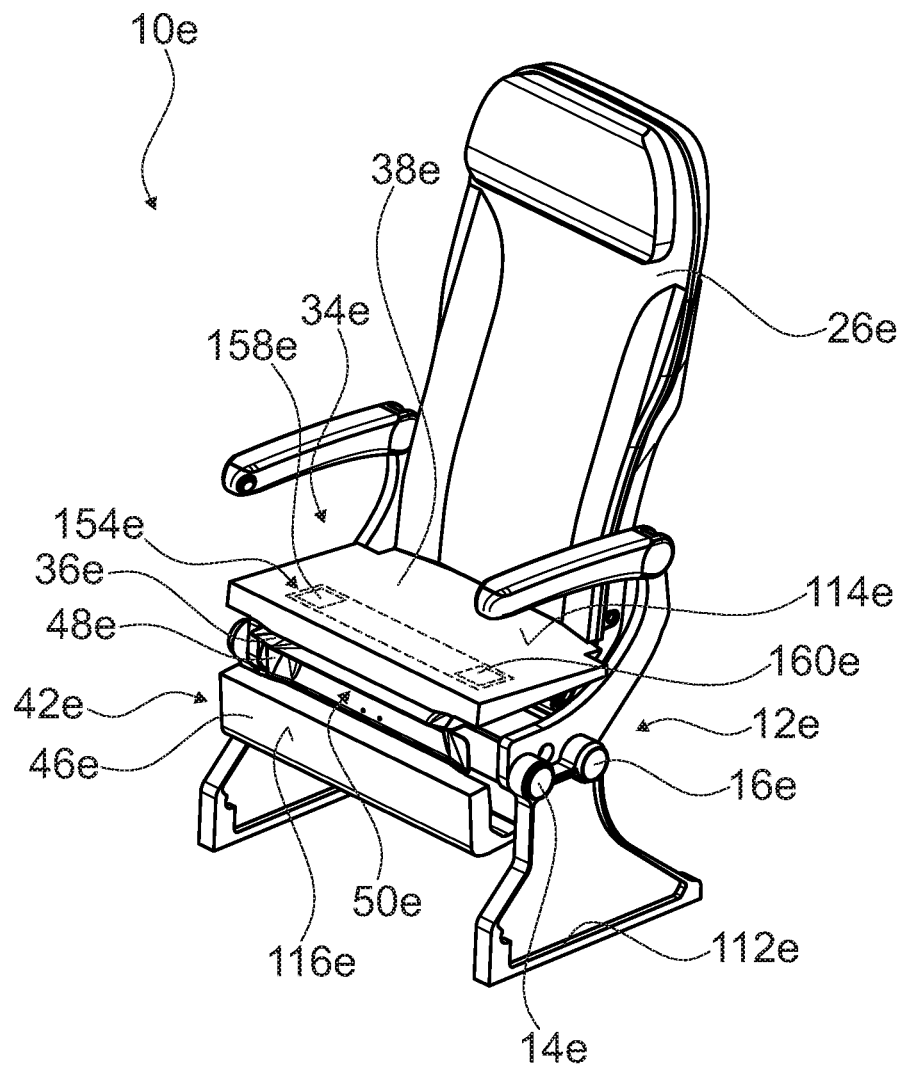
FIG. 13 shows a schematic illustration of the aircraft seat having the aircraft seat device, and of an adjustable sub-unit in a stowage position.

FIG. 7 shows an adjustable sub-unit 42d of a seat bottom 30d of an aircraft seat device in a fourth exemplary embodiment. The adjustable sub-unit 42d by contrast to the other exemplary embodiments is formed by a covering. To this end, the adjustable sub-unit 42d has a covered frame 98d, The frame 98d is implemented so as to be substantially U-shaped. The adjustable sub-unit 42d has a woven fabric 100d which is stretched in the frame 98d, In an assembled state, an upholstery unit (not illustrated in more detail here) which configures an additional seating region that is implemented by the adjustable sub-unit 42d is attached on the woven fabric 100d.

FIGS. 8 to 13 show a fifth exemplary embodiment of an aircraft seat device according to the invention. The aircraft seat device is implemented as part of an aircraft seat 10e. The aircraft seat 10e herein is preferably implemented as part of a seat row not illustrated in more detail here. The aircraft seat 10e is disposed in a region of the aircraft cabin in which an emergency exit of the aircraft is disposed. A region in front of the aircraft seat 10e is implemented as an escape path 110e, The escape path 110e which leads to an emergency exit that is disposed in a lateral wall of the aircraft, when viewed in the direction of flight, is disposed behind the aircraft seat 10e. The escape path 110e is disposed in front of the aircraft seat 10e. The escape path 110e herein has a width which reaches from a backrest of an aircraft seat (not illustrated in more detail) disposed in front of the aircraft seat 10e to a front edge of the aircraft seat 10e. The aircraft seat 10e is implemented as an overwing exit aircraft seat. The aircraft seat 10e in the aircraft cabin is in particular disposed in a region of the wings of the aircraft.

The aircraft seat device comprises a mounting unit 12e by means of which the aircraft seat 10e is attached on a cabin floor of an aircraft cabin. The aircraft seat 10e by means of the mounting unit 12e is capable of being placed on a stand on a stand plane. The cabin floor configures the stand plane. The mounting unit 12e has seat feet 112e which for the assembly in the aircraft cabin by way of connection elements are fixedly connected to guide rails in the cabin floor. One front and one rear seat foot 112e herein are in each case implemented so as to be integral to one another. In principle, it is also conceivable for the front and the rear seat feet to be implemented separately, in each case as a single seat foot. The mounting unit 12e has a transverse support module 120e. The transverse support module 120e in the seating direction of the aircraft seat 10e has an extent of 150 mm. The transverse support module has two transverse supports 14e, 16e. The transverse supports 14e, 16e are implemented as tubular supports. The transverse supports 14e, 16e are part of the mounting unit 12e and run in the transverse direction of the aircraft seat 10e. The transverse supports 14e, 16e are coupled to the mounting unit 12e by way of the seat feet 112e. The seat feet 112e per transverse support 14e, 16e configure in each case one receptacle by way of which the transverse supports 14e, 16e are fixedly coupled to the seat feet 112e. The transverse supports 14e, 16e in the seating direction have a spacing of 50 mm. The aircraft seat device comprises a backrest 26e. The backrest 26e is disposed on a rear end of the aircraft seat 10e. The backrest 26e is coupled to the mounting unit 12e. The backrest 26e is pivotably coupled to the mounting unit 12e.

The aircraft seat device comprises a seat bottom 30e. The seat bottom 30e is configured to implement a seating region 32e for a passenger seated on the aircraft seat 10e. The seat bottom 30e is coupled to the mounting unit 12e. The seat bottom 30e has a main unit 34e. The main unit 34e of the seat bottom 30e configures a seating sub-region 114e. The seating sub-region 114e which is implemented by the main unit 34e of the seat bottom 30e is smaller than a seating region of a seat bottom known from the prior art. The seating sub-region 114e which is implemented by the main unit 34e of the seat bottom 30e configures a rear part of the seating region 32e of the seat bottom 30e. The seating sub-region 114e of the main unit 34e in the seating direction of the aircraft seat 10e has an extent of 270 mm. The main unit 34e does in particular not extend into a region of the escape path 110e. The main unit 34e has a front edge 118e which does not protrude into the escape path. The front edge 118e of the main unit 34e herein does not protrude into the escape path 110e in any position of the main unit 34e.

The main unit 34e of the seat bottom 30e has a base body 36e. The base body 36e is embodied as a seat shell. The base body 36e is coupled to the mounting unit 12e. The base body 36e for coupling to the mounting unit 12e has two accommodation regions for the transverse supports 14e, 16e. The base body 36e is movably connected to the mounting unit 12e. The main unit 34e has an upholstery unit 38e. The upholstery unit 38e is fixedly linked on the base body 36e of the main unit 34e. The upholstery unit 38e herein is formed from a foam material and a cover. The upholstery unit 38e configures the seating region 40e of the main unit 34e.

The seat bottom 30e has a sub-unit 42e, The sub-unit 42e of the seat bottom 30e is embodied as an adjustable sub-unit 42e. The adjustable sub-unit 42e in relation to the mounting unit 12e is adjustable between a stowage position and a use position. The adjustable sub-unit 42e, conjointly with the main unit 34e, is configured to implement the seating region 32e of the seat bottom 30e in the use position. The adjustable sub-unit 42e configures a seating sub-region 116e. The seating sub-region 116e in the use position of the adjustable sub-unit 42e, conjointly with the seating sub-region 114e of the main unit 34e, configures the seating region 32e of the seat bottom 30e. The seating sub-region 114e of the main unit 34e and the seating sub-region 116e of the adjustable sub-unit 42e in the transverse direction of the aircraft seat 10e have a substantially identical extent (width). The adjustable sub-unit 24e, when measured in the seating direction of the aircraft seat 10e, has an extent of 100 mm. In principle, it is also conceivable for the adjustable sub-unit 24e, when measured in the seating direction of the aircraft seat 10e, to have an extent which is in a range from 90 mm to 120 mm.

The adjustable sub-unit 42e in the use position is oriented so as to be substantially horizontal. The adjustable sub-unit 42e in the use position is disposed so as to be substantially level with the seating sub-region 114e of the main unit 34e. In the use position, the seating sub-region 116e of the adjustable sub-unit 42e, conjointly with the seating sub-region 114e of the main unit 34e, configures the entire seating region 32e of the seat bottom 30e.

The adjustable sub-unit 42e comprises an upholstery unit 46e which configures the seating sub-region 116e, The upholstery unit 46e herein is formed from a foam material and a cover. The adjustable sub-unit 42e comprises a base body 48e. The base body 48e is formed by a support element. The base body 48e is formed by a hard shell. The base body 48e of the adjustable sub-unit 42e is formed from a fiber composite material. In principle, it is also conceivable for the base body to be formed from another material that appears expedient to the person skilled in the art such as, in particular, from a sheet metal or a hybrid material. The upholstery unit 46e of the adjustable sub-unit 42e is linked to the base body 48e.

The adjustable sub-unit 42e is implemented so as to be separate from the main unit 34e. The adjustable sub-unit 42e is disposed so as to be pivotable relative to the mounting unit 12e. The adjustable sub-unit 42e is mounted so as to be pivotable in relation to the main unit 34e of the seat bottom 30e. The adjustable sub-unit 42e herein is coupled to the main unit 34e so as to be pivotable directly thereon. For linking the adjustable sub-unit 42e to the main unit 34e, the aircraft seat device has a bearing module 50e. By way of the bearing module 50e the adjustable sub-unit 42e of the seat bottom 30a is mounted so as to be pivotable in relation to the main unit 34e of the seat bottom 30e and, on account thereof, also so as to be pivotable in relation to the mounting unit 12e. The adjustable sub-unit 42e of the seat bottom 30e is pivotable between the stowage position thereof and the use position thereof by way of the bearing module 50e. The bearing module 50e comprises a hinge 122e, The hinge 122e comprises a first connection element 124e and a second connection element 126e that in relation to the first connection element 124e is rotatable about a pivot axis. The two connection elements 124e, 126e are mutually pivotable about the pivot axis. The first connection element 124e is fixedly and rigidly connected to the base body 36e of the main unit 34e. The second connection element 126e is fixedly and rigidly connected to the base body 48e of the adjustable sub-unit 42e. The connection elements 124e, 126e herein are in each case connected to the respective base body 36e, 42e by means of a suitable form-fitting and/or materially integral connection method. The connection elements 124e, 126e are in each case linked on the lower side of the respective base body 36e, 42e. The pivot axis which is implemented by the hinge 122e runs so as to be orthogonal to the seating direction of the aircraft seat 10e.

The aircraft seat device comprises an actuation mechanism 68e. The actuation mechanism 68e is configured for adjusting the adjustable sub-unit 42e between the stowage position thereof and the use position thereof. The actuation mechanism is implemented so as to be integral to the bearing module 50e. The actuation mechanism 68e is configured for a manual adjustment of the adjustable sub-unit 42e. The actuation mechanism 68e is free of spring elements which facilitate a pivoting movement of the adjustable sub-unit 42e between the stowage position thereof and the use position thereof. In order for the adjustable sub-unit 42e to be adjusted from the stowage position thereof to the use position thereof, a passenger has to exert a force on the adjustable sub-unit 42e so as to pivot the latter about the pivot axis of the hinge 122e. The adjustable sub-unit 42e for the adjustment from the stowage position to the use position by a passenger herein is configured for being manually gripped and thus pulled to the use position, for example. The actuation mechanism 68e is implemented so that the pivotable sub-unit 42e can be pivoted in a self-acting manner from a use position to the stowage position. In order for the adjustable sub-unit 42e to be adjusted, no additional force on the adjustable sub-unit 42e is in particular required by a passenger so as to pivot said sub-unit 42e from the use position to the stowage position. The adjustable sub-unit 42e is in particular configured for being moved back from the use position to the stowage position solely by gravity. In principle, it would also be conceivable for the aircraft seat device to comprise a spring element by means of which a movement of the adjustable sub-unit 42e from the use position to the stowage position is facilitated at least in a sub-region of the movement.

For locking the adjustable sub-unit 42e in the use position, the aircraft seat device has a locking unit 90e. The locking unit 90e is configured for mechanically locking the adjustable sub-unit 42e in the use position. The locking unit 90e is configured for locking the adjustable sub-unit 42e in the use position only in a state in which a passenger is seated on the aircraft seat 10e. The locking unit 90e has a locking state and a release state. The locking unit 90e assumes the locking state when a passenger is seated on the aircraft seat 10e. The locking unit 90e assumes the locking state when a seating force acts on the seat bottom 30e, in particular on the main unit 34e. A seating force herein is a force which acts orthogonally on the seating region 32e, on the seat bottom 30e in the direction of the mounting unit 12e. The seating force is preferably formed by a passenger that is seated on the seat bottom 30e of the aircraft seat 10e.

The locking unit 90e comprises a support module 128e. The support module 128e in the use position of the adjustable sub-unit 42e is configured for introducing a force from the adjustable sub-unit 42e into the mounting unit 12e, in particular into the front transverse support 14e. The support module 128e is configured for holding the adjustable sub-unit 42e in the use position thereof in a locking position. In a state in which a passenger is seated on the aircraft seat 10e, part of a seating force which acts on the adjustable sub-unit 42e is dissipated into the mounting unit 12e by way of the support module 128e. The support module 128e has a first support element 130e which is linked to the mounting unit 12e. The first support element 130e is movably connected to the mounting unit 12e. The first support element 130e is pivotably connected to the front transverse support 14e. The first support element 130e has a accommodation region 132e by means of which the first support element 130e encloses the front transverse support 14e, By way of the accommodation region 132e the first support element 130e by way of a friction bearing connection is mounted so as to be rotatable in relation to the front transverse support 14e. In principle, it is also conceivable for the first support element 130e to be movably linked to the front transverse support by way of another mounting, for example by way of a half shell, a four-joint articulation, or any other way that appears expedient to the person skilled in the art. The first support element 130e has two webs 134e that extend away from the accommodation region 132e. The webs 134e are disposed so as to be mutually spaced apart in a transverse direction. The webs 134e extend in the radial direction away from the accommodation region 132e. A shape of the webs 134e herein is identical. The support module 128e has a second support element 136e, In principle, it is also conceivable for the support module 128e to have further support elements which are pivotably coupled to at least one of the support elements 130e, 136e, The second support element 136e by way of a first end is connected to the first support element 130e of the support module 128e. The second support element 136e is pivotably connected to the first support element 130e. For pivotably coupling the second support element 136e to the first support element 130e, the support module 128e has a bolt 138e which is disposed between the webs 134e of the first support element 130e. The second support element 136e by way of a second end is connected to the adjustable sub-unit 42e. The second support element 136e is pivotably connected to the adjustable sub-unit 42e. The second support element 136e is linked on a lower side of the adjustable sub-unit 42e. The second support element 136e by way of the second end thereof is connected to the adjustable sub-unit 42e by way of a bearing bolt 140e. The support module 128e has an abutment 142e which delimits mutual twisting of the two support elements 130e, 136e. To this end, the second support element 136e at the first end thereof configures a part of the abutment 142e. The first support element 130e has an abutment bolt 144e which is disposed between the webs 134e of the first support element 130e. In order for pivoting of the second support element 136e in relation to the first support element 130e to be delimited, the abutment 142e impacts the abutment bolt 144e. In the locking position of the support module 128e, thus in the use position of the adjustable sub-unit 42e, the abutment 142e impacts the abutment bolt 144e. On account thereof, the adjustable sub-unit 42e from the stowage position can be pivoted to the maximum extent to the use position. Further upward pivoting from the stowage position beyond the use position is prevented by the abutment 142e.

The locking unit 90e for locking the adjustable sub-unit 42e in the use position comprises a locking element 146e. The locking element 142e is configured for locking the support module 128e in the locking position. The locking element 146e is implemented as a hook element. The locking element 146e is movably disposed on the mounting unit 12. The locking element 146e is pivotably linked on the front transverse support 14. The locking element 146e at a first end is pivotably linked to the front transverse support 14e by way of a bearing point (not illustrated in more detail). The locking element 146e at a second end has a form-fitting element 148e. The form-fitting element 48e is implemented as a hook. The form-fitting element 148e of the locking element 146e for locking the support module 128e is configured for coming into a form-fitting contact with the first support element 130e of the support module 128e. The first support element 130e has a form-fitting element 150e which is implemented in a manner corresponding to that of the form-fitting element 148e of the locking element 146e. The locking element 146e for locking by way of the form-fitting element 148e thereof is to engage in the form-fitting element 150e of the first support element 130e. The locking element 146e by way of the form-fitting element 148e thereof in a locking position of the locking element 146e engages in the form-fitting element 150e of the first support element 130e. The locking element 146e blocks the first support element 130e against rotation about the front transverse support 14e when the form-fitting element 148e engages in the form-fitting element 150e of the first support element 130e. The locking element 146e blocks a rotation of the first support element 130e in the rotation direction which corresponds to an adjustment of the adjustable sub-unit 42e from the use position to the stowage position. In the locking position, a force which is introduced from a passenger seated on the aircraft seat 10e into the front sub-unit 42e by way of the support elements 130e, 136e of the support module 120e is introduced into the mounting unit 12e, in particular the front transverse support 14e, by way of the locking element 146e. The form-fitting element 150e of the first support element 130e is embodied as a recess. The form-fitting element 150e of the first support element 130e is disposed in a region of the accommodation region 132e of the first support element 130e. In the rotation of the first support element 130e about the front transverse support 14e the form-fitting element 150e is displaced relative to the locking element 146e. In the locking position of the locking unit 90e in which the adjustable sub-unit 42e is disposed in the use position thereof, the form-fitting element 150e of the first support element 130e is oriented so as to be congruent with the form-fitting element 148e of the locking element 146e. In the locking position of the locking unit 90e in which the adjustable sub-unit 42e is disposed in the use position thereof, the form-fitting element 148e of the locking element 146e can engage in the form-fitting element 150e of the first support element. In the locking position in which the form-fitting element 148e of the locking element 146e engages in the form-fitting element 150e of the first support element 130e of the support module 128e, the locking unit 90 is in a locking state. In a release state of the locking unit 90e the locking element 146e is not connected in a form-fitting manner to the form-fitting element 150e of the first support element 130e, In the release state of the locking unit 90e the locking element 146e is disposed in a release position. In the release position, the locking element 146e is pivoted from the locking position upward in the direction of the seat bottom 30e.

The locking unit 90e has an actuation element 152e. The actuation element 152e is configured for actuating the locking unit 90e. The actuation element 152e is configured for being actuated by a seating force which acts on the seat bottom 30e, in particular on the main unit 34e, of the seat bottom 30e. The actuation element 152e has a resting position and an actuation position. The resting position is implemented as a neutral position of the actuation element 152e in which no seating force acting on the main unit 34e of the seat bottom 30e acts in particular on the actuation element 152e. The locking unit 90e has a spring module 154e. The spring module 154e is configured for exerting a spring force on the actuation element 152e, said spring force acting in the direction of the resting position of the actuation element 152e. In a state in which there is no force acting on the main unit 34e of the seat bottom 30e that acts on the actuation element 152e, the actuation element 152e is held in the resting position thereof by way of the spring force of the spring module 154e. The actuation element 152e is configured for actuating the locking element 146e. The actuation element 152e is configured for adjusting the locking element 146e between the locking position thereof and the release position thereof. The actuation element 152e is coupled to the locking element 146e. In the resting position of the actuation element 152e, the actuation element 152e holds the locking element 146e in the release position thereof.

The actuation element 152e is implemented as a plate-shaped element. The actuation element 152e is disposed on an upper side of the base body 36e of the main unit 34e. The actuation element 152e in an assembled state is disposed between the base body 36e and the upholstery unit 38e of the main unit 34e. In principle, it is also conceivable for the entire main unit 34e to configure the actuation element 152e.

In principle, it is likewise conceivable for the actuation element 152e to be disposed below the seat bottom, in particular below the base body 36e of the main unit 34e of the seat bottom 30e. The actuation element 152e on the upper side thereof builds up an actuation face. The actuation element 152e, in particular the actuation face, herein extend across approximately 50% of the seating sub-region 114e of the main unit 34e. The actuation element 152e has a width of 200 mm. The width herein is measured orthogonally to the seating direction of the aircraft seat. The actuation element 152e has a length of 125 mm. The length of the actuation element 152e is measured in the seating direction of the aircraft seat 10e, The actuation element 152e at the rear end thereof is connected to the base body 36e of the main unit 34e. The actuation element 152e is pivotably connected to the base body 36e of the main unit 34e. The base body 36e has a bearing point 156e for linking the actuation element 152e, The bearing point 156e is disposed in a rear region of the base body 36e that faces the backrest 26e. The actuation element 152e extends from the bearing point 156e into a front third of the base body 36e. The spring module 154e is disposed in a forward region of the actuation element 152e. The spring module 154e is disposed between the base body 36e and the actuation element 152e, The spring module 154e exerts a spring force on the actuation element 152e, said spring force pushing the actuation element 152e away from the base body 36e. In the resting position, the actuation element 152e by way of the forward end thereof is pushed away from the base body 36e of the main unit 34e by the spring module 154e. In the actuation position, the actuation element 152e by way of the front end thereof is pushed onto the upper side of the base body 36e by a force such as, in particular, a seating force, counter to the spring force of the spring module 154e. The spring module 154e has two compression springs 158e, 160e. The two compression springs 158e, 160e are disposed in lateral regions of the actuation element 152. In principle, it is also conceivable for the spring module to have another number of spring elements, wherein it is in principle also conceivable for the spring elements to be implemented as springs other than compression springs. An advantageous introduction of force into the actuation element 154e can be achieved on account thereof.

For coupling to the locking element 146e, the actuation element 152e has a coupling region 162e. In order for the coupling region 162e to be implemented, the actuation element 152e at the front end thereof has downward-running webs 164e. The webs 164e are embodied as entrainment members for unlocking the locking element 146e. In principle, it is also conceivable for the actuation element 152e to have entrainment members for the locking element 146e that are implemented in another manner such as, for example, as loop elements from a flexural material, for example from a wire or a rope. The webs 164e extend below the base body 36e. To this end, the base body 36e has a through bore 166e which in an assembled state is disposed in the region of the web 164e. The actuation element 152e by way of the webs 164e thereof extends through the through bore 166e, from an upper side of the base body 36e onto a lower side of the base body 36e. The webs 164e at a lower end have a kink by way of which the coupling region 162e is formed. The webs 164e of the actuation element 152e are coupled to the locking element 146e in the coupling region 162e. In the coupling region 162e the webs 164e are connected in a form-fitting manner to the locking element 146e, at least in the resting position of the actuation element 152e. On account of the coupling region 162e, the actuation element 152e in the resting position of the actuation element 152e holds the locking element 146e in the release position thereof. In the actuation position of the actuation element 152e the webs 164e, and thus the coupling region 162e, are moved downward, on account of which a movement of the locking element 146e is enabled and said locking element 146e can be moved to the locking position. In a movement of the actuation element 152e from the resting position thereof to the actuation position thereof, the webs 164e, and on account thereof the coupling region 162e, move downward, and a form-fitting coupling between the coupling region 162e and the locking element 146e is released, and the locking element 146e can be moved out of the release position thereof. The locking element 146e upon being released from the coupling region 162e herein is moved from the release position of said locking element 146e in the direction of the locking position thereof only by gravity. In principle however, it is likewise conceivable for the locking unit 90e to have an additional spring element which exerts a force on the locking element 146e that facilitates a movement of the locking element 146e from the release position to the locking position. If the locking element 146e is released by the actuation element 152e and on account thereof no longer held in the release position, the locking element 146e by way of the form-fitting element 148e thereof bears on an external circumference 168e of the accommodation region 132e of the first support element 130e of the support module 128e when the adjustable sub-unit 42e is disposed in the stowage position thereof, or is in particular not disposed in the use position thereof, respectively. If the locking element 146e is released by the actuation element 152e and on account thereof is no longer held in the release position, the locking element 146e by way of the form-fitting element 148e thereof latches into the form-fitting element 150e of the first support element 130e when the adjustable sub-unit 42e is disposed in the use position thereof and on account thereof the form-fitting element 150e of the first support element 130e is brought so as to be congruent with the form-fitting element 148e of the locking element 146e. If the locking unit 90e is locked in the locking position thereof, in which the locking element 146e by way of a form-fit of the form-fitting element 148e thereof is thus locked with the form-fitting element 150e of the first support element 130e of the support module 128e, and the adjustable sub-unit 42e fixed in the use position thereof, the locking element 146e in an adjustment of the actuation element from the actuation position thereof to the resting position thereof is entrained by means of the coupling region 162e and moved from the locking position of said locking element 146e to the release position thereof. On account thereof, locking of the first support element 130e is cancelled, and the support module 128e on account of the weight force of the adjustable sub-unit 42e automatically collapses, and the first support element 130e pivots about the front transverse support 14e such that the adjustable sub-unit 42e is moved back from the use position thereof to the stowage position.

The aircraft seat device has at least one delay module 170e. The delay module 170e is configured, in case of a discontinuation of a holding force and/or locking force to hold the adjustable sub-unit 46e in the use position for a defined temporal interval. The delay module 170e is disposed on the locking unit 90e. The delay module 170e is configured for delaying a reset of the actuation element 152e from the actuation position thereof to the resting position once the force on the actuation element 152e, in particular the seating force exerted by a passenger, is absent. This arises in particular when a passenger gets up from the aircraft seat 10*e*, in particular from the seat bottom 30*e*. The delay module 170*e* in the absence of the actuation force, in particular the seating force, is configured for holding of the actuation element 152*e* for a defined temporal interval in the actuation position thereof. To this end, the delay module 170*e* has a damper element. The defined temporal interval is five seconds. On account thereof, the locking unit 90*e* in the absence of the actuation force remains in the locking position during the defined temporal interval and thus holds the adjustable sub-unit 42*e* in the use position thereof in as far as the latter at this point in time is disposed in the use position. After the expiry of the defined temporal interval the delay module 170*e* enables the movement of the actuation element 152*e* on account of which the latter is moved from the actuation position thereof to the resting position thereof. On account thereof, the locking unit 90*e* is in the release position thereof, and the adjustable sub-unit 42*e* moves from the use position to the stowage position. If an actuation force on the actuation element 152*e* is built up again prior to the expiry of the defined temporal interval, the locking unit 90*e* thus remains in the locking position. On account thereof, it can advantageously be achieved that the adjustable sub-unit 42*e* remains in the use position even in a brief absence of a force on the actuation element 152*e*, for example on account of the passenger briefly getting up from the aircraft seat 10*e*. In principle, it is also conceivable for the delay module 170*e* to be directly linked to the adjustable sub-unit 42*e*, It is conceivable herein, for example, for the delay module 170*e* to be integrated in the support module 128*e*. The delay module 170*e* herein would be configured for holding a movement of the adjustable sub-unit and/or of the support module 128*e* in the use position or in the locking position, respectively, for the defined temporal interval despite the locking unit being disposed in the release position thereof.

A functional mode of the aircraft seat device and an adjustment of the adjustable sub-unit 42*e* by a passenger is to be briefly described hereunder. In a state in which there is no passenger seated on the aircraft seat 10*e*, the adjustable sub-unit 42*e* is in the stowage position thereof. The adjustable sub-unit 42*e* herein is folded downward. The adjustable sub-unit herein is in particular not disposed in the escape path and clears the latter for a particularly advantageous and barrier-free use. When a passenger now sits down on the aircraft seat 10*e*, in particular on the main unit 34*e* of the seat bottom 30*e*, the passenger by way of his/her weight force adjusts the actuation element 152*e* from the resting position to the actuation position, counter to the spring force of the spring module 154*e*, On account thereof, the actuation element 152*e* releases the locking element 146*e* such that the latter is no longer fixed in its release position. Initially, the locking element 146*e* by way of the form-fitting element 148*e* thereof can bear only on the external circumference 168*e* of the accommodation region 132*e* of the first support element 130*e* of the support module 128*e*. The passenger can now manually move the adjustable sub-unit 42*e* from the stowage position in the direction of the use position. The passenger herein can engage on any arbitrary location of the adjustable sub-unit 42*e*. In principle, it is also conceivable for the adjustable sub-unit 42*e* to have a separate gripping element such as, for example, a loop which is configured for being gripped by a passenger and for moving the adjustable sub-unit 42*e* from the stowage position thereof. As soon as the adjustable sub-unit 42*e* is pivoted to the use position thereof, the form-fitting element 150*e* of the first support element 130*e* of the support module 128*e* is congruent with the form-fitting element 148*e* of the locking element 146*e*. The locking element 146*e* by way of the form-fitting element 148*e* thereof latches in a self-acting manner into the form-fitting element 150*e* and locks the locking unit 90*e*. The adjustable sub-unit 42*e* is thus locked in the use position and conjointly with the main unit 34*e* configures the entire seating region 32*e* of the seat bottom 30. As long as the passenger is seated on the seat bottom 30*e* and in particular on the main unit 34*e*, and a force on the actuation element 152*e* holds the latter in the actuation position thereof, the adjustable sub-unit 42*e* remains in the use position thereof. A seating force which acts on the adjustable sub-unit 42*e* is directed by way of the base body 48*e* into the second support element 136*e* into the second support element 130*e* where this generates a torque about the front transverse support, said torque being received by the locking element 146*e* and introduced into the mounting unit 12*e*. If the passenger gets up from the aircraft seat 10*e*, the spring module 154*e* pushes the actuation element 152*e* from the actuation position to the resting position of said actuation element 152*e*. The coupling region 162*e* herein entrains the locking element 146*e* from the locking position thereof to the release position thereof, on account of which the form-fitting connection between the form-fitting element 150*e* of the first support element 130 and the form-fitting element 148*e* of the locking element 146*e* is released. The first support element 130*e* by way of the accommodation region 132*e* can again rotate freely about the front transverse support 14*e*. On account of the weight force of the adjustable sub-unit 42*e*, the support elements 130*e*, 136*e* are pushed downward, and the adjustable sub-unit 42*e* moves in a self-acting manner back to the stowage position. The adjustable sub-unit 42*e* thus adjust itself in a self-acting manner once a passenger has got up from the seat bottom 30*e* of the aircraft seat 10*e*, thus adjusts without further input of the passenger from the use position to the stowage position. On account thereof, the escape path can be kept clear in a particularly advantageous manner as soon as the aircraft seat 10*e* is no longer being used.

LIST OF REFERENCE SIGNS

10 Aircraft seat
12 Mounting unit
14 Transverse support
16 Transverse support
18 Seat divider
20 Seat divider
22 Armrest
24 Armrest
26 Backrest
28 Actuation element
30 Seat bottom
32 Seating region
34 Main unit
36 Base body
38 Upholstery unit
40 Seating region
42 Adjustable sub-unit
44 Additional seating region
46 Upholstery unit
48 Base body
50 Bearing module
52 Bearing block
54 Bearing block
56 Bearing accommodation
58 Bearing accommodation
60 Holding arm
62 Holding arm 64 Connection region
66 Connection region
68 Actuation mechanism
70 Actuator element
72 Actuation rod
74 Connection point
76 Actuation element
78 Cushion
80 Connection line
82 Protective cover
84 Gap
86 Sensor device
88 Pressure sensor
90 Locking unit
92 Control apparatus
94 Pressure sensor
96 Sensor element
98 Frame
100 Woven fabric
102 Torsion element
104 Spring steel sheet
106 Pivot axis
108 Connection block
110 Escape path
112 Seat foot
114 Seating sub-region
116 Seating sub-region
118 Front edge
120 Transverse support module
122 Hinge
124 Connection element
126 Connection element
128 Support module
130 Support element
132 Accommodation region
134 Web
136 Support element
138 Bolt
140 Bearing bolt
142 Abutment
144 Abutment bolt
146 Locking element
148 Form-fitting element
150 Form-fitting element
152 Actuation element
154 Spring module
156 Bearing point
158 Compression spring
160 Compression spring
162 Coupling region
164 Webs
166 Through bore
168 External circumference
170 Delay module

The invention claimed is:

1. An aircraft seat device for an aircraft seat, having at least one mounting unit, having at least one seat bottom which is coupled with the mounting unit and is configured to implement a seating region and to this end has at least one main unit and at least one sub-unit that in relation to the mounting unit is implemented so as to be adjustable between a stowage position and a use position, wherein the at least one adjustable sub-unit is configured for enlarging the seating region in at least one position, and having at least one actuation mechanism by means of which the adjustable sub-unit of the seat bottom is adjustable between its stowage position and its use position, comprising at least one delay module which, following a discontinuation of a holding force, is configured for holding the adjustable sub-unit in the use position for at least a defined temporal interval, wherein the aircraft seat device has a locking unit for locking the adjustable sub-unit in the use position, wherein the locking unit is configured for mechanically locking the adjustable sub-unit in the use position, wherein the locking unit in the absence of the actuation force remains in the locking position during the defined temporal interval and thus holds the adjustable sub-unit in the use position thereof in as far as the latter at this point in time is disposed in the use position.

2. The aircraft seat device as claimed in claim 1, wherein the adjustable sub-unit is implemented to be continuously blockable between its stowage position and its use position by means of the at least one actuation mechanism.

3. The aircraft seat device as claimed in claim 1, wherein the at least one actuation mechanism has at least one actuation element via which the adjustable sub-unit is adjustable by a passenger.

4. The aircraft seat device as claimed in claim 1, wherein the actuation mechanism comprises at least one sensor device which, for an adjustment of the adjustable sub-unit, detects at least one sensor signal.

5. The aircraft seat device as claimed in claim 4, wherein, for triggering the adjustment of the adjustable sub-unit the sensor device is configured at least for a detection of a seating force acting on the seat bottom.

6. The aircraft seat device as claimed in claim 1, wherein the actuation mechanism comprises at least one actuator element which, for an adjustment of the adjustable sub-unit, is actuatable by the actuation element and/or by the sensor device.

7. The aircraft seat device as claimed in claim 1, wherein the adjustment of the adjustable sub-unit is coupled with an adjustment of a backrest.

8. The aircraft seat device as claimed in claim 1, wherein the actuation mechanism is configured for a purely manual actuation of the adjustable sub-unit from the stowage position into the use position.

9. The aircraft seat device as claimed in claim 1, comprising at least one locking mechanism for locking the adjustable sub-unit in a use position, said locking mechanism being configured for being brought into a locking position by a seating force acting on the seat bottom.

10. The aircraft seat device as claimed in claim 9, wherein the locking mechanism has at least one actuation element, which is disposed in a seating region of the seat bottom.

11. The aircraft seat device as claimed in claim 10, wherein the actuation element spans at least 30% of a seating sub-region of the main unit of the seat bottom.

12. An aircraft seat having an aircraft seat device as claimed in claim 1.

13. The aircraft seat device as claimed in claim 1, comprising a region in front of the aircraft seat, which is implemented as an escape path, wherein the main unit of the seat bottom does not extend into the region of the escape path.

14. The aircraft seat device as claimed in claim 1, wherein in the use position a seating sub-region of the adjustable sub-unit, conjointly with a seating sub-region of the main unit, configures the entire seating region of the seat bottom.

15. The aircraft seat device as claimed in claim 1, wherein the delay module is configured for delaying a reset of an actuation element from its actuation position to its resting position once the force on the actuation element, in particular the seating force exerted by a passenger, is absent.

16. The aircraft seat device according to claim 1, wherein the delay module comprises at least one damper element which is configured for providing a force which directly or indirectly holds the adjustable sub-unit in the use position at least for the defined temporal interval.

17. The aircraft seat device according to claim 1, wherein the delay module is in particular configured for preventing an adjustment of the adjustable sub-unit from the use position to the stowage position during the defined temporal interval.

18. The aircraft seat device according to claim 1, wherein the delay module is configured for delaying a reset of the actuation element from the actuation position thereof to the resting position once the force on the actuation element is absent.

19. The aircraft seat device according to claim 18, wherein the force on the actuation element is implemented as a seating force exerted by a passenger.

20. An aircraft seat device for an aircraft seat, having at least one mounting unit, having at least one seat bottom which is coupled with the mounting unit and is configured to implement a seating region and to this end has at least one main unit and at least one sub-unit that in relation to the mounting unit is implemented so as to be adjustable between a stowage position and a use position, wherein the at least one adjustable sub-unit is configured for enlarging the seating region in at least one position, and having at least one actuation mechanism by means of which the adjustable sub-unit of the seat bottom is adjustable between its stowage position and its use position, comprising at least one delay module which, following a discontinuation of a holding force, is configured for holding the adjustable sub-unit in the use position for at least a defined temporal interval, wherein the aircraft seat device has a locking unit for locking the adjustable sub-unit in the use position, wherein the locking unit is configured for mechanically locking the adjustable sub-unit in the use position, wherein if an actuation force on an actuation element is built up again prior to the expiry of the defined temporal interval, the locking unit thus remains in the locking position.

\* \* \* \* \*